(12) United States Patent
Dubrovsky et al.

(10) Patent No.: US 11,232,201 B2
(45) Date of Patent: Jan. 25, 2022

(54) CLOUD BASED JUST IN TIME MEMORY ANALYSIS FOR MALWARE DETECTION

(71) Applicant: SonicWALL Inc., Milpitas, CA (US)

(72) Inventors: Aleksandr Dubrovsky, Los Altos, CA (US); Soumyadipta Das, Bangalor (IN); Senthilkumar Gopinathan Cheetancheri, Fremont, CA (US)

(73) Assignee: SonicWALL Inc., Milpitas, CA (US)

( * ) Notice: Subject to any disclaimer, the term of this patent is extended or adjusted under 35 U.S.C. 154(b) by 54 days.

(21) Appl. No.: 16/055,958

(22) Filed: Aug. 6, 2018

(65) Prior Publication Data

US 2019/0347413 A1 Nov. 14, 2019

Related U.S. Application Data

(60) Provisional application No. 62/671,293, filed on May 14, 2018.

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 21/561* (2013.01)

(58) Field of Classification Search
CPC ...... G06F 21/561; G06F 21/53; G06F 21/566; G06F 21/54

(Continued)

(56) References Cited

U.S. PATENT DOCUMENTS 6,154,844 A 11/2000 Touboul et al.
6,804,780 B1 10/2004 Touboul
(Continued)

FOREIGN PATENT DOCUMENTS

EP 3 732 571 11/2020
GB 2553033 2/2018
(Continued)

OTHER PUBLICATIONS

Software Instrumentation Wiley Encyclopedia of Computer Science and Engineering, edited by Benjamin Wah. Copyright © 2008 John Wiley & Sons, Inc. (Year: 2008).*

(Continued)

*Primary Examiner* — Benjamin A Kaplan
(74) *Attorney, Agent, or Firm* — Polsinelli LLP

(57) ABSTRACT

Methods and apparatus consistent with the present disclosure may be performed by a Cloud computing device may use instrumentation code that remains transparent to an application program that the instrumentation code has been injected into, may perform deep packet inspection (DPI) on computer data, or identify a content rating associated with computer data. In certain instances, data sets that include executable code may be received via packetized communications or be received via other means, such as, receiving a file from a data store. The present technique allows one or more processors executing instrumentation code to monitor actions performed by the program code included in a received data set. Malware can be detected using exception handling to track memory allocations of the program code included in the received data set. Furthermore, access to content associated with malware, potential malware, or with inappropriate content ratings may be blocked.

20 Claims, 14 Drawing Sheets

(58) Field of Classification Search
USPC .......................................................... 726/24
See application file for complete search history.

(56) References Cited

U.S. PATENT DOCUMENTS

| | | | |
|---|---|---|---|
| 6,965,968 | B1 | 11/2005 | Touboul |
| 7,058,822 | B2 | 6/2006 | Edery et al. |
| 7,523,502 | B1* | 4/2009 | Kennedy ............... G06F 21/554 |
| | | | 709/201 |
| 7,613,926 | B2 | 11/2009 | Edery et al. |
| 7,647,633 | B2 | 1/2010 | Edery et al. |
| 7,934,103 | B2* | 4/2011 | Kidron .................. H04L 63/145 |
| | | | 713/188 |
| 7,962,959 | B1* | 6/2011 | Batenin ................... G06F 21/56 |
| | | | 711/133 |
| 7,971,255 | B1 | 6/2011 | Kc et al. |
| 7,975,305 | B2 | 7/2011 | Rubin et al. |
| 8,104,089 | B1 | 1/2012 | Guo et al. |
| 8,141,154 | B2 | 3/2012 | Gruzman et al. |
| 8,146,151 | B2* | 3/2012 | Hulten ..................... G06F 21/51 |
| | | | 726/16 |
| 8,225,408 | B2 | 7/2012 | Rubin et al. |
| 8,276,202 | B1 | 9/2012 | Dubrovsky et al. |
| 8,307,432 | B1 | 11/2012 | Feng |
| 8,413,235 | B1 | 4/2013 | Chen et al. |
| 8,539,578 | B1 | 9/2013 | Zhou et al. |
| 8,595,829 | B1 | 11/2013 | Kane |
| 8,645,923 | B1 | 2/2014 | Satish et al. |
| 8,677,494 | B2 | 3/2014 | Edery et al. |
| 8,832,836 | B2 | 9/2014 | Thomas et al. |
| 8,910,238 | B2 | 12/2014 | Lukacs et al. |
| 9,141,794 | B1 | 9/2015 | Soubramanien et al. |
| 9,202,048 | B2 | 12/2015 | Sallam |
| 9,411,953 | B1 | 8/2016 | Kane et al. |
| 9,516,055 | B1 | 12/2016 | Liu |
| 9,836,604 | B2 | 12/2017 | Coronado et al. |
| 9,990,497 | B2 | 6/2018 | Spernow et al. |
| 10,685,110 | B2 | 6/2020 | Das |
| 10,873,589 | B2 | 12/2020 | Cheetancheri |
| 10,902,122 | B2 | 1/2021 | Das |
| 2002/0009079 | A1 | 1/2002 | Jungck et al. |
| 2003/0033542 | A1 | 2/2003 | Goseva-Popstojanova et al. |
| 2006/0224724 | A1 | 10/2006 | Marinescu et al. |
| 2007/0157203 | A1 | 7/2007 | Lim |
| 2007/0261112 | A1 | 11/2007 | Todd et al. |
| 2008/0016339 | A1 | 1/2008 | Shukla |
| 2009/0070876 | A1 | 3/2009 | Kim et al. |
| 2010/0185876 | A1 | 7/2010 | Kim |
| 2010/0269171 | A1 | 10/2010 | Raz et al. |
| 2011/0047620 | A1 | 2/2011 | Mahaffey et al. |
| 2011/0078794 | A1 | 3/2011 | Manni et al. |
| 2011/0277033 | A1 | 11/2011 | Ramchetty et al. |
| 2012/0266243 | A1 | 10/2012 | Turkulainen |
| 2013/0080625 | A1 | 3/2013 | Morinaga et al. |
| 2013/0091584 | A1 | 4/2013 | Liebmann et al. |
| 2014/0181976 | A1 | 6/2014 | Snow et al. |
| 2014/0208426 | A1 | 7/2014 | Natarajan et al. |
| 2014/0215621 | A1 | 7/2014 | Xaypanya et al. |
| 2015/0089651 | A1 | 3/2015 | Mirski et al. |
| 2015/0096018 | A1 | 4/2015 | Mircescu |
| 2015/0096022 | A1 | 4/2015 | Vincent et al. |
| 2015/0227742 | A1 | 8/2015 | Pereira |
| 2016/0098560 | A1 | 4/2016 | Friedrichs et al. |
| 2016/0099963 | A1 | 4/2016 | Mahaffey et al. |
| 2016/0357958 | A1* | 12/2016 | Guidry .................... G06F 21/53 |
| 2016/0378640 | A1 | 12/2016 | Hron |
| 2017/0171240 | A1 | 6/2017 | Arzi et al. |
| 2017/0289176 | A1 | 10/2017 | Chen et al. |
| 2017/0329621 | A1* | 11/2017 | Beckett ...................... G06F 8/76 |
| 2018/0018459 | A1 | 1/2018 | Zhang et al. |
| 2019/0052651 | A1 | 2/2019 | Cheetancheri |
| 2019/0065740 | A1 | 2/2019 | van Riel et al. |
| 2019/0114421 | A1 | 4/2019 | Das |
| 2019/0205537 | A1 | 7/2019 | Das |
| 2019/0236275 | A1 | 8/2019 | Das |
| 2019/0342313 | A1* | 11/2019 | Watkiss .............. H04L 63/1416 |
| 2019/0354680 | A1* | 11/2019 | De Lima Junior ...... G06N 5/02 |
| 2020/0380127 | A1 | 12/2020 | Das |
| 2021/0185062 | A1 | 6/2021 | Cheetancheri |

FOREIGN PATENT DOCUMENTS

| | | |
|---|---|---|
| WO | WO 2019/032702 | 2/2019 |
| WO | WO 2019/075388 | 4/2019 |
| WO | WO 2019/133637 | 7/2019 |
| WO | WO 2019/222261 | 11/2019 |

OTHER PUBLICATIONS

PCT Application No. PCT/US2018/055694 International Search Report and Written Opinion dated Feb. 11, 2019.
U.S. Appl. No. 15/671,445 Office Action dated Feb. 25, 2019.
PCT Application No. PCT/US2018/045814 International Search Report and Written Opinion dated Oct. 19, 2018.
PCT/US19/32283, Cloud Based Just in Time Memory Analysis for Malware Detection, May 14, 2019.
PCT Application No. PCT/US2018/067541 International Search Report and Written Opinion dated Mar. 27, 2019.
U.S. Appl. No. 15/783,793 Final Office Action dated Dec. 11, 2019.
U.S. Appl No. 15/671,445, Senthil Cheetancheri, Real-Time Prevention Malicious Content Via Dynamic Analysis, filed Aug. 8, 2017.
PCT/US18/45814, Real-Time Prevention Malicious Content Via Dynamic Analysis, Aug. 8, 2018.
U.S. Appl No. 15/783,793, Soumyadipta Das, Just in Time Memory Analysis for Malware Detections, filed Oct. 13, 2018.
PCT/US18/55694, Just in Time Memory Analysis for Malware Detections, Oct. 12, 2018.
U.S. Appl. No. 15/858,785, Soumyadipta Das, Detection of Exploitative Program Code, filed Dec. 29, 2017.
U.S. Appl No. 15/890,192, Soumyadipta Das, Just in Time Memory Analysis for Malware Detections, filed Feb. 6, 2018.
PCT Application No. PCT/US2019/032283 International Search Report and Written Opinion dated Sep. 12, 2019.
U.S. Appl. No. 15/671,445 Final Office Action dated Aug. 15, 2019.
U.S. Appl. No. 15/858,785 Office Action dated Sep. 6, 2019.
U.S. Appl. No. 15/890,192 Office Action dated Oct. 4, 2019.
U.S. Appl. No. 15/783,793 Office Action dated Jun. 28, 2019.
U.S. Appl. No. 16/903,060, Soumyadipta Das, Detection of Exploitative Program Code, filed Jun. 16, 2020.
U.S. Appl. No. 15/890,192 Final Office Action dated Jan. 21, 2020.
PCT Application No. PCT/US2018/055694 International Preliminary Report on Patentability dated Apr. 14, 20.
U.S. Appl. No. 15/671,445 Office Action dated May 14, 2020.
U.S. Appl. No. 15/783,793 Office Action dated Apr. 16, 2019.
U.S. Appl. No. 15/890,192 Office Action dated Jun. 11, 2020.
Nethercote, Nicholas; "Dynamic binary analysis and instrumentation", Technical Report, UCAM-CL-TR-606, ISSN 1476-2986, Nov. 2004.
"XOR Cipher—Wikipedia", Mar. 19, 2017, XP055758581, Retrieved from the Internet: URL:https://en.wikipedia.org/w/index.php?title=XOR_cipher&oldid=771112755 [retrieved on Dec. 9, 2020].
European Application No. 18844091.1 Extended European Search Report dated Jan. 19, 2021.
U.S. Appl. No. 15/783,793 Office Action dated Feb. 22, 2021.
PCT Application No. PCT/US2018/045814 International Preliminary Report on Patentability dated Feb. 11, 2020.
PCT Application No. PCT/US2018/067541 International Preliminary Report on Patentability dated Jun. 30, 2020.
U.S. Appl. No. 15/783,793 Final Office Action dated Oct. 14, 2020.
PCT Application No. PCT/US2019/032283 International Preliminary Report on Patentability dated Nov. 17, 2020; 9 pages.
European Application No. 18894474.8 Extended European Search Report dated Aug. 3, 2021.

* cited by examiner

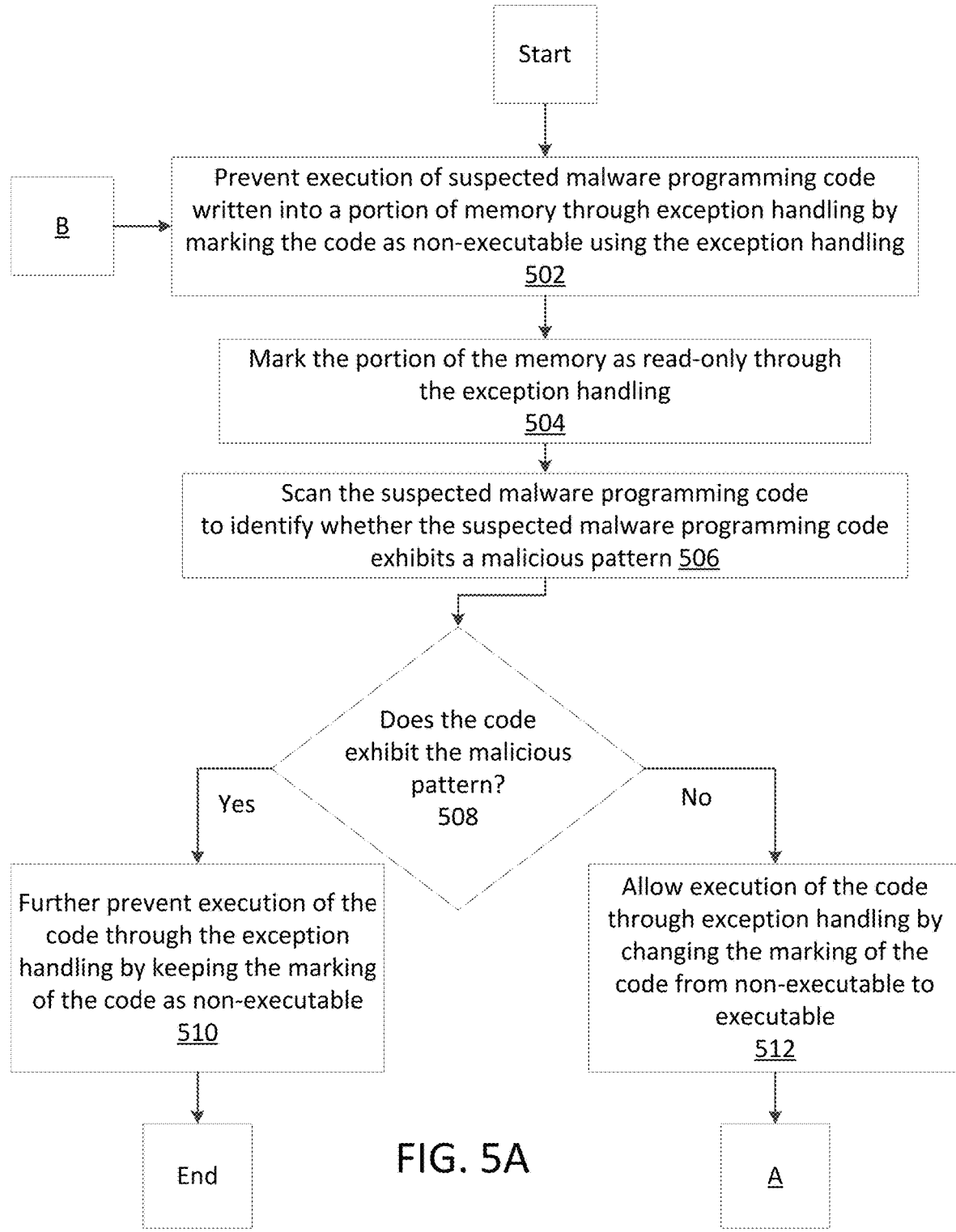

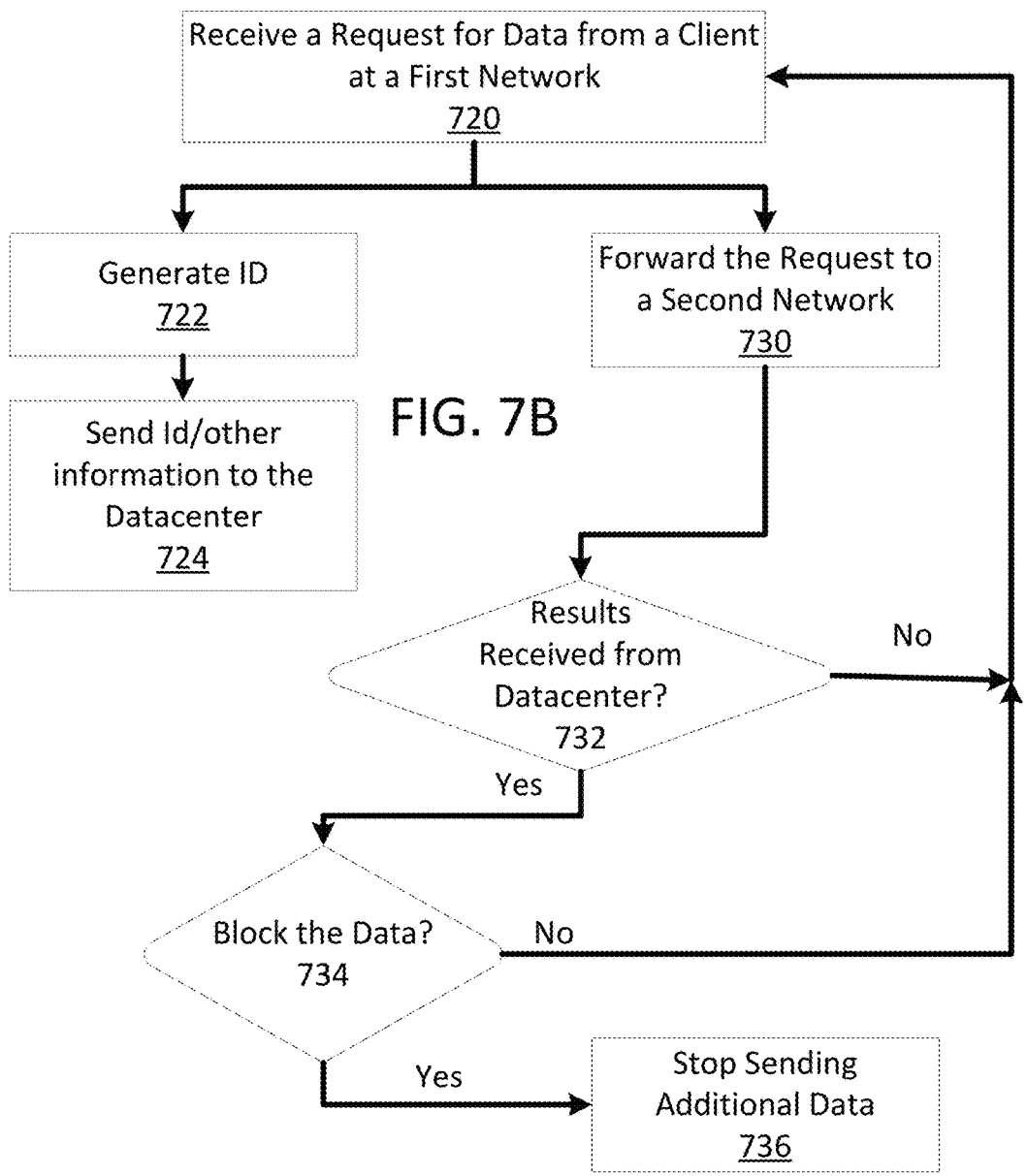

CLOUD BASED JUST IN TIME MEMORY ANALYSIS FOR MALWARE DETECTION

CROSS-REFERENCE TO RELATED APPLICATIONS

This application claims the priority benefit of U.S. provisional patent application 62/671,293 filed May 14, 2018, the disclosure of which is incorporated herein by reference.

BACKGROUND OF THE INVENTION

Field of Invention

The present invention generally relates to identifying whether computer data includes malicious content. More specifically, the present invention relates to identifying whether malware is included in one or more data packets transmitted from a first computer to a second computer or is included in computer data stored in a memory.

Description of the Related Art

One of the greatest threats to privacy and to secure computer data are various sorts of computer malware, such as computer viruses or eavesdropping software. Generally malware can be any software program that includes code that executes without the knowledge or authorization of an owner or user of a computing device.

Malware is typically distributed by parties with nefarious intent. Malware is commonly used steal or destroy computer data or to snoop or spy the actions of a user when the user operates a computer. Malware is also frequently used to damage a computer or to damage computer data. For example malware may be used to steal personal or financial information, blackmail computer users by denying access to their own data unless or until a fee is paid, or to damage infected computers by damaging data stored on those infected computers. Malware can reside in sets of data packets transferred between computers or can reside in a data storage device in the form of a file, for example.

Malware broadly refers to malicious software designed to infiltrate and/or damage a computer system and/or network without the informed, or knowledge of an owner of a computer or computer network.

Furthermore, newly developed malware is increasingly difficult to identify. Frequently, until a particular sort of malware has been identified and characterized, conventional techniques that identify whether a communication includes malware can miss detecting the presence of that malware in the communication. This may occur when information in one or more received data packets is hidden or when the malware is not identifiable by a signature associated with the information in the received data packets.

Presently thousands of new malware samples are discovered all over the internet each day. According to the popular malware detection website Virustotal.com, an average number of unique malware samples identified daily are above 800,000. This huge number of malware samples traversing the internet poses a significant challenge for detection using known pattern matching methods employed by traditional anti-malware solutions.

Significantly, almost all the new malware samples we observe each day are actually repackaged versions of known malware. Individuals that generate malware today often obfuscate the presence of malicious code by packing it within other executable code or by compressing it. In certain instances this is performed using binary packing software or a form of software that is referred to as "protector" software. This packing or "protecting" function may reorganize or manipulate a piece of original malware code into a structure that cannot be detected using conventional packet scanning. As such, repackaged versions of old malware successfully evade detection when conventional scanning techniques such as deep packet inspection (DPI) are used. DPI relies on pattern matching data included in a set of data packets with attributes associated with or signatures generated from previously identified malicious code.

When a repackaged malware is received and is executed by a computing device, that malware reveals (unpacks) its internal malicious code and associated data in process memory where the malicious code is then executed by a processor at the computing device. The difficulty in detecting repackaged malware is compounded by the fact that memory extraction of code and data does not generate any operating system events, such as a system call or call-backs which can be intercepted externally. Hence malicious code can silently be extracted, executed and removed from memory.

Since malware can and is used by those to steal or destroy computer data and since repackaged malware can avoid detection when conventional techniques are used, what are needed are detection methods that do not depend on the content of a set of computer data.

Another conventional approach for identifying actions performed by a processor executing instructions out of a memory involves dumping memory and analyzing the content of memory at a point in time. In certain instances, such memory dumps may be performed after a malware causes a computer to crash or to perform another malicious act. Identifying the presence of malware in a data set by examining data included in a memory dump is much like sorting through heaps of forensic evidence that may or may not be related to malicious act. This is because at the time of the memory dump, memory would include data related to normal computer program activity and may include data associated with malware. A practitioner may have little to no ability to identify what data was necessarily normal or what data was associated with malware. In such instances a practitioner may not be aware of which instructions actually performed a malicious act. Hence we need a memory detection solution which can correctly identify the point at which the malicious code is available in memory for detection such that malicious acts can be observed as program code executes at run-time. What are also needed are detection methods and apparatus that analyze actions performed by malicious code while remaining unobserved (undetected) by the malicious code itself.

SUMMARY OF THE CLAIMED INVENTION

The presently claimed invention relates to a method, a non-transitory computer readable storage medium, or an apparatus executing functions consistent with the present disclosure for preventing malicious content from affecting the operation of a computer. A method consistent with the present disclosure may receive information from a computing device via a network interface. After that information is received, computer data associated with the received information may be accessed and an analysis of that data may be performed on that computer data. The analysis performed may include identifying a content rating related to the computer data, performing a deep packet inspection scan on the computer data, or monitoring actions performed by program code associated with the accessed computer data as the program code executes. After the analysis is performed, the method of the presently claimed invention may identify that at least one of that the accessed computer data are associated with content rating, a known set of malware, or that the program code performs suspicious activity after which the content rating or a result may be sent to the computing device, wherein a remaining portion of the computer data accessed is blocked from being sent to a second computing device based on the at least of the content rating being inappropriate or the result sent to the computing device.

When the presently claimed invention is implemented as a non-transitory computer readable storage medium, a processor executing instructions out of a memory may perform methods consistent with the present disclosure. Here again the method may receive information from a computing device via a network interface. After that information is received, computer data associated with the received information may be accessed and an analysis of that data may be performed on that computer data. The analysis performed may include identifying a content rating related to the computer data, performing a deep packet inspection scan on the computer data, or monitoring actions performed by program code associated with the accessed computer data as the program code executes. After the analysis is performed, the method of the presently claimed invention may identify that at least one of that the accessed computer data are associated with content rating, a known set of malware, or that the program code performs suspicious activity after which the content rating or a result may be sent to the computing device, wherein a remaining portion of the computer data accessed is blocked from being sent to a second computing device based on the at least of the content rating being inappropriate or the result sent to the computing device.

Systems consistent with the present disclosure may also perform methods consistent with the present disclosure. Such systems may include one or more computers located in a cloud computing environment where a computer may receive information from a computing device via a network interface. After that information is received, computer data associated with the received information may be accessed and an analysis of that data may be performed on that computer data. The analysis performed may include identifying a content rating related to the computer data, performing a deep packet inspection scan on the computer data, or monitoring actions performed by program code associated with the accessed computer data as the program code executes. After the analysis is performed, the method of the presently claimed invention may identify that at least one of that the accessed computer data are associated with an content rating, a known set of malware, or that the program code performs suspicious activity after which the content rating or a result may be sent to the computing device, where a remaining portion of the computer data accessed is blocked from being sent to a second computing device based on the at least of the content rating being inappropriate or the result sent to the computing device.

BRIEF DESCRIPTION OF THE DRAWINGS

FIGS. 5A and 5B illustrate steps of using exception handling to prevent execution of suspected malware program code.

FIG. 7A illustrates one embodiment of a method to process a file request at a firewall/gateway device.

FIG. 7B illustrates one embodiment of a method to perform cloud-based firewall/gateway anti-virus scanning.

DETAILED DESCRIPTION

Figure 1:
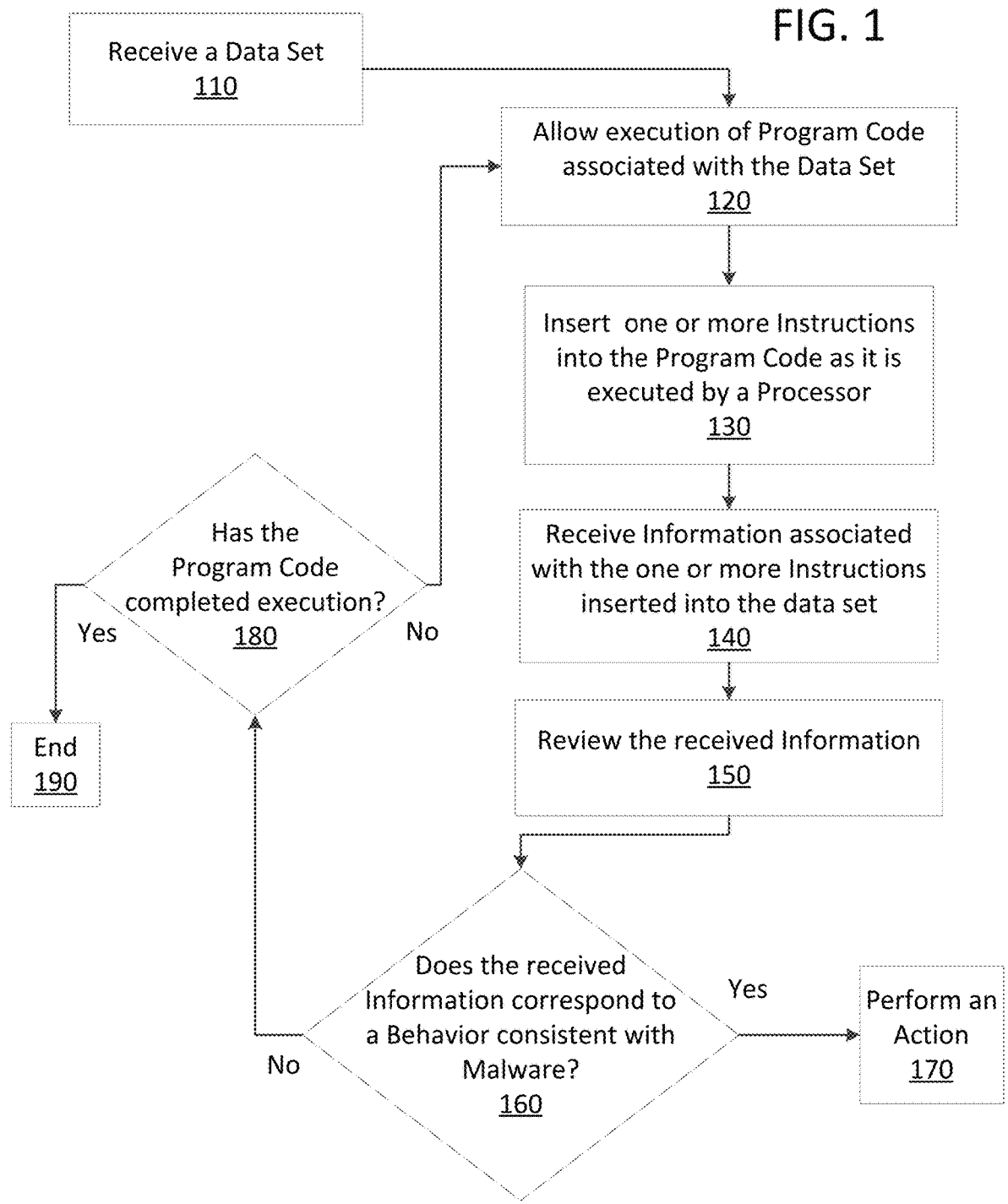
FIG. 1 illustrates a set of steps that may be performed by a Dynamic Binary Instrumentation (DBI) framework that analyzes the behavior of program code associated with a data set.

The present disclosure is directed to evaluating digital content, performing deep packet inspection scanning (DPI) on computer data, and to monitoring internal process memory of a computer at a time when program code executes. Methods and apparatus consistent with the present disclosure may identify that data accessed by or request by a client is associated with an undesirable content rating (or prohibited content), matches a signature associated with malware, or that monitors the operation of program code (executable code). In certain instances, computer data analyzed by methods and systems consistent with the present disclosure may be associated with a file or with computer data that has been received via data packets sent over a computer network. Malware may be detected by scanning suspect program code with a malware scanner, malware may be detected by identifying suspicious actions performed by a set of program code, or malware may be detected by a combination of such techniques.

U.S. Pat. No. 8,769,678, entitled Cloud-based gateway security scanning is incorporated by reference into this application. U.S. provisional patent application 62,624,757 filed Jan. 31, 2018, and U.S. patent application Ser. No. 15/783,793 filed Oct. 13, 2017 are incorporated herein by reference into this application.

Methods and systems consistent with the present disclosure may be implemented in a Cloud computing environment. Those of ordinary skill in the art at the time of the invention would understand that a Cloud computing environment may include one or more computers associated with a data center that is accessible via a computer network. As such, a Cloud computing environment consistent with the present disclosure may be accessible via the Internet and be physically remote from a client computer or from firewalls/ gateway computers that are associated with another computer network (such as a corporate Intranet, for example). Furthermore, firewall/gateway computers consistent with the present disclosure may be physically remote from a client computer. For example, a client computer could reside in a person's home, a firewall/gateway may reside at an Internet server provider (ISP), and analysis computers may reside in a datacenter that is remote from the ISP and the client computer.

The methods and apparatus consistent with the present disclosure may use a technique referred to as a dynamic binary instrumentation (DBI) framework or tool that is used to analyze a given set of computer data. Dynamic binary instrumentation (DBI) is a method of analyzing the behavior of a binary application at runtime through the injection of instrumentation code. This instrumentation code executes as part of the normal instruction stream after being injected. Rather than considering what may occur, dynamic binary analysis has the benefit of operating on what actually does occur. While not necessarily exhaustive in terms of exercising all code paths in an application, DBI provides detailed insight into an application's concrete execution state.

The instrumentation code can remain entirely transparent to an application that it's been injected into, the instrumentation code may be used to pass context information relating to the behavior of that software application as it executes in real-time. As such, processes performed by an application program may be monitored by a processor executing code that analyzes what the application program does by reviewing the context information passed from the instrumentation code. This context information includes, yet is not limited to the content of certain computer registers, parameters associated with a process performed by a processor executing code of the application, the content of certain memory locations, information that relates to the state of a memory, or information relating to the allocation of memory. Analysis of an application at runtime using binary instrumentation makes it possible to gain insight into the behavior of a particular application including internal CPU registers and memory state of the application throughout its execution. As such, the detection of malware by DBI highlights one of the key differences between DBI and conventional static binary analysis.

Note that program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with a DBI framework. Alternatively or additionally analysis code may analyze data stored in memory by scanning the contents of memory with techniques associated with deep packet inspection (DPI). As such, analysis software may identify malicious or suspicious code via instrumentation code that matches program code contexts to criteria that is associated with suspicious code. Furthermore, analysis software may identify malicious code by matching signatures associated with known malware with data stored in memory. Furthermore, analysis of computer data or files requested by a client device may be associated with a content rating that may be used to restrict access to prohibited, unacceptable, or unauthorized content according to a policy.

When malware binaries contain encrypted or obfuscated code that unpacks itself into memory during execution before their malicious code is executed, the operation of unpacking the malware may include sending requests to the operating system to allocate additional memory or may include the use pre-allocated memory that is available on an executable process image loaded into memory. The newly allocated memory or the pre-allocated memory may include one or more memory pages that are or were allocated as part of a single memory allocation region. When computer data is loaded into a particular memory region, information relating to the use of that memory may be collected or observed by observation code consistent with the present disclosure. Typically, when memory is loaded with computer data, an operating system (OS) loader is invoked to actually perform the function of loading memory with that computer data. OS loaders are used to load executable programs, computer library data, or other data into memory. As such, the loading of data into a region of memory may be associated with one or more states that may be used by observation code as that computer data is evaluated for the presence of malware. States that may be consistent with the presence of malware may include the writing to a particular memory region by a particular compute process, an association of a particular compute process with a particular set of computer data, the invocation of an OS program loader, or the invocation of another OS function or command.

When malware that includes obfuscated or encrypted code, data may then be written to a newly allocated or previously allocated memory region. In certain instances, program code that includes obfuscated malware may first move or copy the obfuscated malware code and data into a memory location, where a processor executing that program code may de-obfuscate obfuscated malware before that malware is executed by the processor. Alternatively or additionally, program code that includes obfuscated malware may move or copy the malware related data to the memory as part of a de-obfuscation logical process. De-obfuscated malware may also be written to a particular memory region after the obfuscated malware has been de-obfuscated. Ultimately, the goal of computer hackers is to insert a Trojan (malicious code) into memory of a computing device where it can be executed as that Trojan performs an intended malicious activity.

Using a DBI framework, inserted program code can be used identify that a memory region is currently being allocated. The inserted program code may also access to information relating to all a set of pre-allocated memory that is associated with a certain computer process or set of computer data. As such, the DBI framework maintains visibility on memory regions as they are being written to. The DBI framework may also be aware of a current code execution path. All of this information may be used to identify that a particular memory region is being accessed that was previously written to. In an instance where a memory region has been overwritten since the region has been allocated to a particular process and consequently that same memory region is where the current code execution path reaches, then program code associated with the DBI framework can identify that dynamically unpacked code is being executed. In certain instances, the program code of the DBI framework may associate a set of computer data as being suspect of including malware after which data stored in the associated memory region can then be dumped as a file on disk for further analysis using known pattern matching techniques.

Methods and apparatus consistent with the present disclosure herein may also prepare data included in a set or stream of data packets for evaluations that may identify whether the malware is included in the data packet set.

The de-obfuscating of a set of computer data may include decrypting, reordering, or resequencing data included in that set of computer data. In certain instances, a portion of the data included in the set of computer data may be decrypted. The decryption may include XORing at least a portion of the data included in the data packet set with other data or with other data included in the data packet set. The decryption of the computer data may be associated with the possible presence of malware in that data set. As such, the XORing of data in a set of computer may cause a computer data set to be classified as possible malware.

An Example of reordering/resequencing received data includes reorganizing received data according to an interleaving process that reshuffles data or commands. Such a process is similar to shuffling a deck of cards where each card is equivalent to one or more data bits/bytes. In such instances, data from different portions of a data packet or from different packets sent between computers or data from a file may be reorganized forming an executable data set that may include malware. To accomplish this, code included in one or more data packets or in a file may include instructions for reordering data included in the data set after it is received. The execution of those instructions may generate malicious code from data that has intentionally been obfuscated to prevent a deep packet inspection (DPI) engine from detecting malware hidden within the data packet set.

The analysis of the data in the data packets may include executing program code included in the data packets and monitoring the execution of that program code when watching for unauthorized or suspicious actions performed by the program code. Unauthorized actions include, yet are not limited to writing to a boot block, updating a system registry, making changes to the file system, deleting computer data, copying data, transmitting data to another computer, or intercepting calls to a set of basic input/output instructions (BIOS) of a computer executing that program code. The intercepting of BIOS calls by the program code may be identified by observing program code replacing an original BIOS related command with another command or by observing that program code modifying parameters that were included in the original BIOS related command before the original BIOS command can be executed. As such, the analysis function may execute program code for the destination computer using a "Sandboxing" technique, thus allowing the program code to be evaluated for malware in a secure environment. In certain instances, methods and apparatus consistent with the present disclosure may combine "Sandboxing" with deep packet inspection (DPI) or with identifying a content rating. Once malware has been identified, signatures may be generated from the packet data for future use by processors that perform a DPI function. Sandboxing and DPI may be performed in parallel, thus detecting malware that has not been previously identified may be identified by a "Sandboxing" technique or detecting malware that has been previously identified may be identified via matching DPI techniques.

The analysis of data included in the data packet set may also observe the execution of program code and identify that the executed program code performs a function relating to organizing further instructions for execution from data included in the plurality of data packets. Once observed, this analysis may then classify this reorganization of data as an unauthorized action after which the data packet set or program code may be blocked or sequestered. As such, content included in a data set may be classified as malware based on how or what functions program code within that data set are performed.

Determinations relating to the identification of malware may also be based on a set of rules that identify what program behaviors are authorized or that are unauthorized. For example, a rule may be used to classify data within a data set as malware whenever data within that data set is reorganized/reshuffled or when data within that data set is manipulated or de-obfuscated by an XOR function. Alternatively another rule may indicate that the decryption of packet data is acceptable as long as it is performed in a manner consistent with a standard or expected type of decryption (such as decryption associated with a TCP communication). This other rule may also indicate that further analysis of program data is required after the decryption has been performed.

Even in instances where the reorganization of data is observed, methods consistent with the present disclosure may include continuing the analysis of program code included in a data packet set with the intent of identifying whether that program code performs malicious actions and what malicious acts it does perform. Furthermore, signatures may be generated from the reorganized data for later use by a deep packet inspection (DPI) engine, for example.

Methods consistent with the present disclosure may be implemented in a Cloud/Internet computing environment, where a computer in the 'Cloud' accessible via the Internet may analyze data, computer files, content related to a web page, or packetized data when identifying whether that data, files, web page content, or data packets include potentially malicious program code.

FIG. 1 illustrates a set of steps that may be performed by a Dynamic Binary Instrumentation (DBI) framework that analyzes the behavior of program code associated with a data set. In step 110, a set of data may be received by a computing device. That set of data may have been received via packet communication, than has been retrieved from a data storage, or that may have been received by other means. After step 110, program flow move to step 120 where program code associated with the received data set is allowed to be executed, for example, by a processor executing instructions out of a memory. Next in step 130 of FIG. 1, one or more instructions may be inserted into the program code as it is executed by a processor. These instructions may be inserted either in random locations or may be inserted based on activities or access patterns associated with the program code. For example, when certain Operating System functions or certain types of instructions are initiated or are completed. Like hitting a breakpoint set in a computer emulator, the DBI framework can trigger an action based on commands initiated or executed by a processor. Once the DBI framework identifies an event, it may insert an instruction and then collect and report information related to that instruction to the DBI framework in between individual instructions of the program code being analyzed. This process can be transparent to the program code, as it may occur without processes associated with the program code receiving information relating to the inserted commands.

Then in step 140 of FIG. 1, information relating to the inserted instructions may be received and that received information may be reviewed in step 150 of FIG. 1. Determination step 160 then identifies whether the received information corresponds to a behavior that may be consistent with malware. As such, step 150 may identify that the program code is suspect, identify that the program code is malware, or identify that the program code does not appear to be malware. When determination step 160 identifies that the behavior of the program code may be consistent with malware or is malware, program flow moves to step 170 where an action is performed. Actions that mat be performed at step 170 include, yet are not limited to sequestering the data set, saving the data set for future analysis, sending the data set to another computing device for analysis, or dumping/deleting the data set. Sequestering the data set may include storing the data set in a location that is associated with suspected malicious code. For example, a data set may be stored in a directory used to store only suspected malicious code or that data set may be sent to an external computing device for storage and further analysis.

As such, corrective actions that may be performed after a data set has been identified as possibly including malicious code include, yet are not limited to storing the data set in a storage location associated with a classification indicating that the data set possibly includes malicious code and/or modifying the data set to include the classification and storing the modified data set, where that modification of the data set may include adding the classification to metadata associated with the data set. Alternatively or additionally such corrective actions may include: performing a function that modifies the data set, the modification of the data set by the function, thereby disables the executable code included in the data set, and storing the modified data set. In certain instances a processor associated with analyzing a data set may receive a data set that has been modified to prevent execution of program code in that data set, enable the executable code included in the data set by reversing a function that disabled the executable code, execute instructions associated with that data set, and monitors activity performed by the one or more executable code instructions.

In certain instances a data set that includes suspected malicious code may be modified, for example by adding metadata information that identifies the data set as possibly being malicious.

In other instances, suspected data sets may be modified in a manner that renders program code in the data set inactive. For example, an instruction could be added to the data set that causes program code in the data set to be bypassed using a jump instruction that causes program execution to jump from an initial command to the end of a program. In instances where program code is modified in a manner that renders it inactive, the data set may be sent to another computer for further analysis. This other computer may then remove the jump instruction and run the program code when performing further analysis. For this other computer to be able to reactivate an executable program that has been deactivated by a first computer, a program executing at this other computer may use information that has been shared between or known by both of these computers.

When determination step 160 identifies that the program code does not appear to be consistent with malware, program flow moves to determination step 180 that identifies whether the program code has completed. When the program code has completed, the flow chart of FIG. 1 ends at step 190. When determination step 180 identifies that the program code has not completed, program flow moves back to step 120 where the program code is once again allowed to execute.

Figure 2:
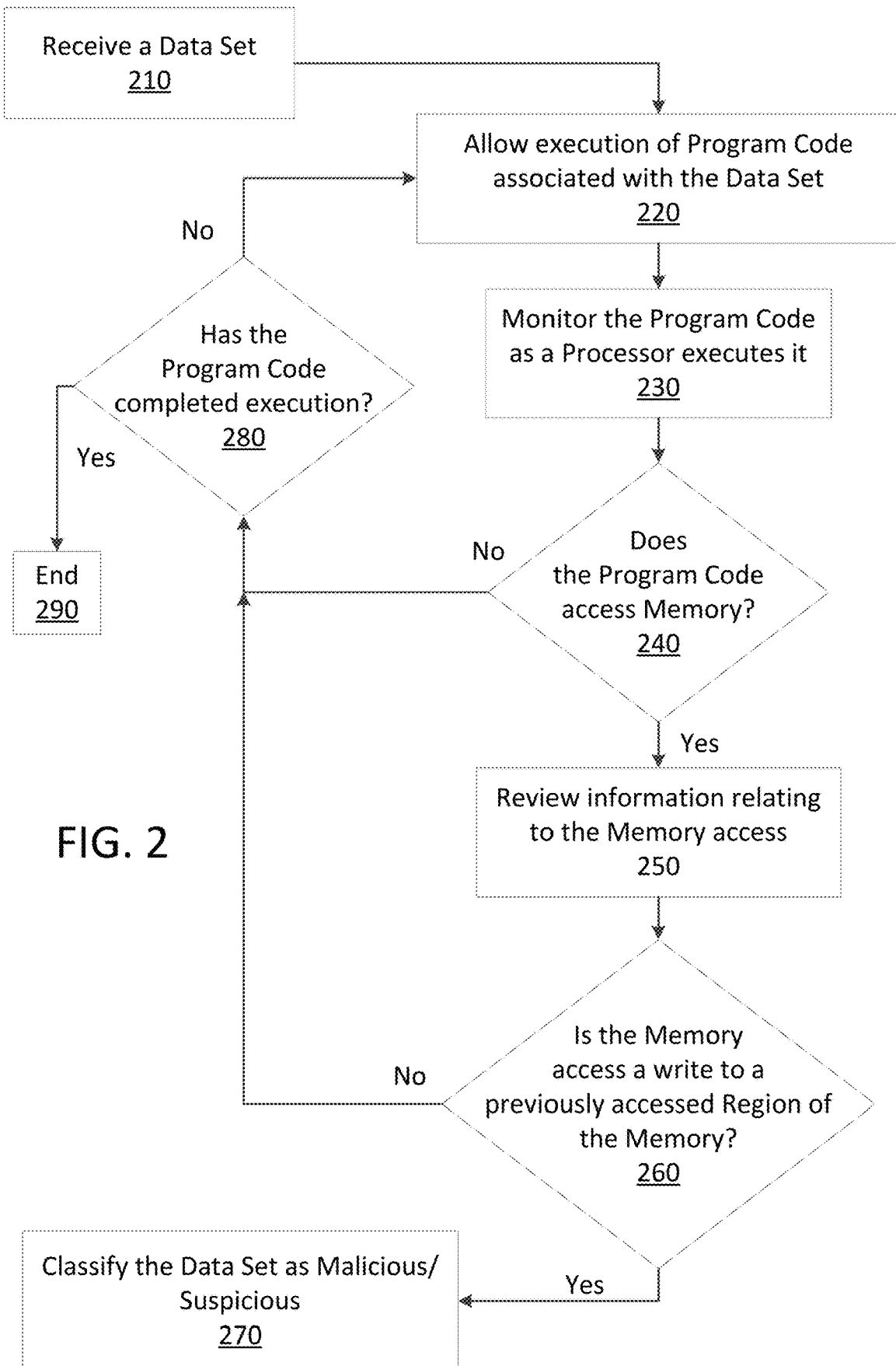
FIG. 2 illustrates a set of steps that identifies a memory access pattern that may be associated with malicious program code.

FIG. 2 illustrates a set of steps that identifies a memory access pattern that may be associated with malicious program code. FIG. 2 begins with step 210 that receives a data set, next program code associated with that data set is allowed to execute in step 220 of FIG. 2. After step 220, step 230 monitors the program code as it executes. Determination step 240 then identifies whether the operation of the program code accessed memory. This memory access may relate to allocating memory, reading from a memory, or writing to a memory. When step 240 identifies that the program code has accessed memory, program flow moves to step 250 where information relating to that memory access is reviewed. This review may correlate information related to the memory allocation with one or more reads or writes to that allocated memory. The review may correlate information related to a multiple writes to a location in or a region of memory.

After step 250, determination step 260 identifies whether this memory access is a write to a previously accessed location or region of the memory. When determination step 260 identifies that the memory access accesses a location that has been previously accessed by the program code, that program code may be classified as malicious or suspicious in step 270 of FIG. 2. This determination may be made based on data stored in memory matching a predefined criteria or pattern. For example, memory content may be matched to criteria that associates suspicious events to a suspicious criteria using DBI techniques when identifying suspicious code. Alternatively or additionally, memory content may be identified as being malicious when scanned memory content matches signatures of known malicious code. Step 270 may identify a portion (or area of program code) of the data set received in step 210 is malicious or suspicious such that methods consistent with the present disclosure may focus on analyzing program code included in the identified portion/area of suspicious program code when that program code is further analyzed.

The program flow of FIG. 2 may flow from step 240 to step 280 when determination step 240 identifies that the program code does not access the memory. Program flow also flows from step 260 to step 280 when determination step 260 identifies that the memory access is not related to a previously accessed memory location or region. Determination step 280 then identifies whether the program code has completed. When the program code has completed, the flow chart of FIG. 2 ends at step 290. When determination step 280 identifies that the program code has not completed, program flow moves back to step 220 where the program code is once again allowed to execute.

Figure 3:
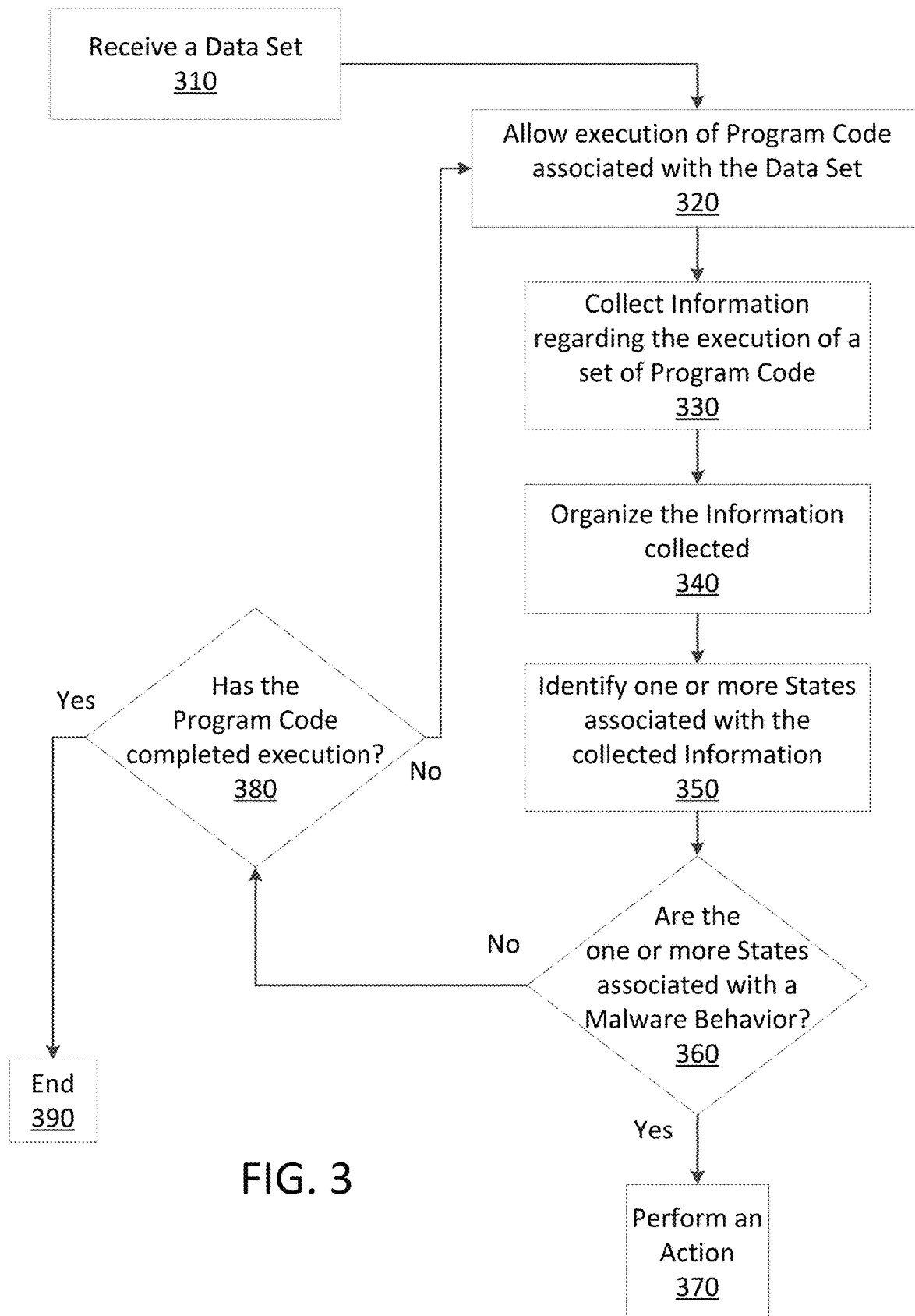
FIG. 3 illustrates a series of steps where executable code is observed while it is executed by a processor.

FIG. 3 illustrates a series of steps where executable code is observed while it is executed by a processor. FIG. 3 begins with step 310 where a data set is received, next in step 320 program code associated with that data set is allowed to execute. Step 330 of FIG. 3 is where information relating to the executed program code is collected. The information collected in step 330 may include context information that relates to the behavior of that software application as it executes in real-time. This context information may include the content of certain computer registers, parameters associated with a process performed by a processor executing code of the application, the content of certain memory locations, information that relates to the state of memory, information relating to the allocation of memory, or the initiation or completion of an operating system call or operation.

After information is collected in step 330, that information may be organized in step 340 of FIG. 3. The organization of collected information may store that collected information based on a classification. For example, the invocation of an operating system loader may be stored with a classification of a command associated with loading a program into memory. Next, in step 350 one or more states associated with the collected information may be identified. As such, step 350 may identify states associated with allocating memory, states relating to accessing memory, or states associated with writing different operating system calls. Alternatively or additionally states that may be associated with malware may include collecting information from a computing device and preparing that information to be sent to another computing device, may include initiating a write to a system registry, or may include initiating a write to a system area on a disk drive.

After step 360 determination step 360 may determine whether the states identified in step 350 appear to be related to malware. When determination step 360 identifies that the states identified in step 350 appear to be related to malware, program flow may move from step 360 to step 370 where an action may be performed. Here again, Actions that may be performed include, yet are not limited to sequestering the data set, saving the data set for future analysis, sending the data set to another computing device for analysis, or dumping/deleting the data set.

When determination step 370 identifies that the identified states appear not to be related to malware, program flow may move from step 360 to determination step 380 that identifies whether the program code has completed execution, when no program flow may move from step 380 back to step 320 where the program code is allowed to continue executing. When determination step 380 identifies that the program code has completed, program flow will move from step 380 to step 390 where the flow chart of FIG. 3 ends.

Figure 4:
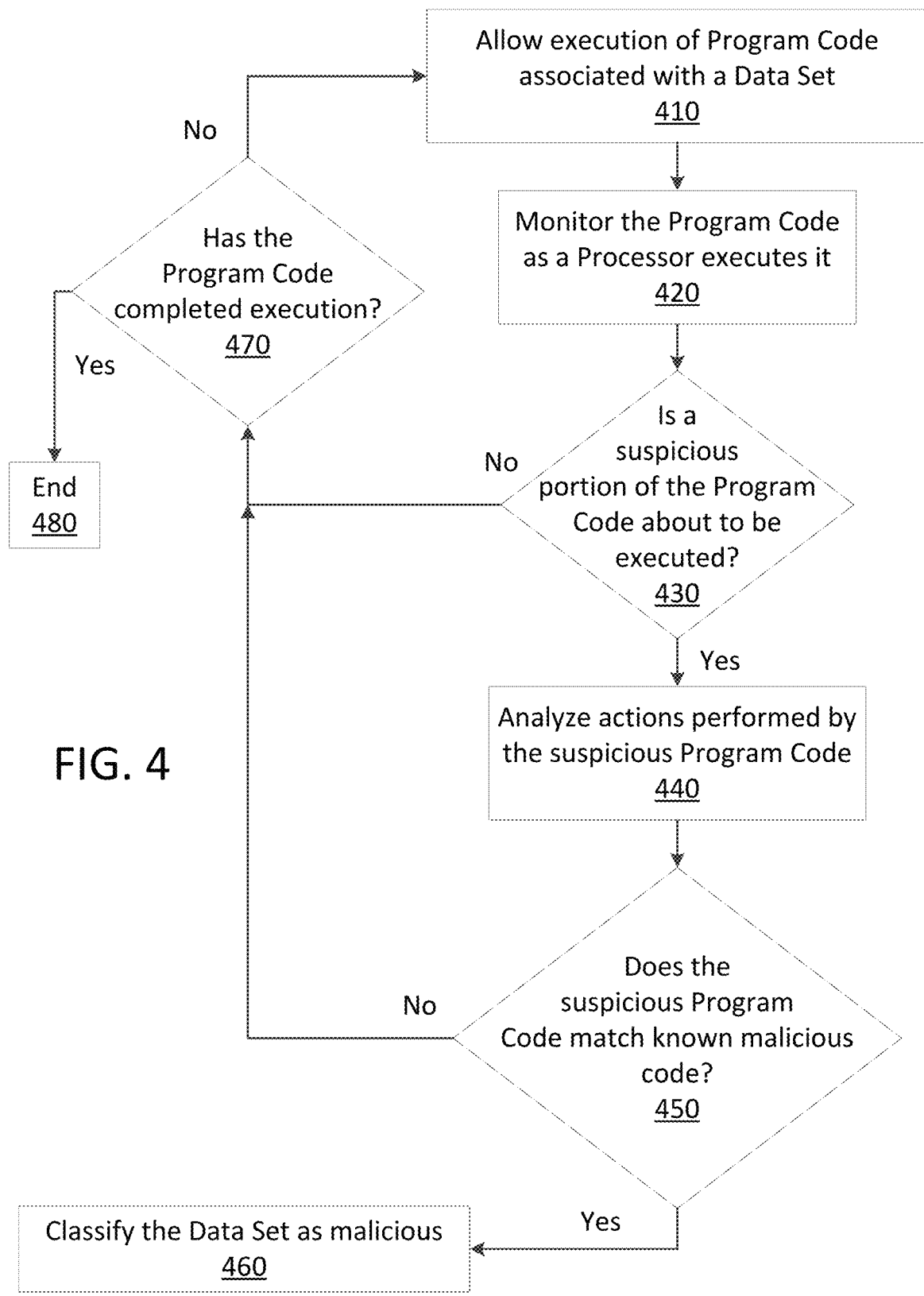
FIG. 4 illustrates an instance where the analysis of program code in a received data set is focused on a portion of program code of a data set that may have been classified as being suspicious by operations of the flow chart of FIG. 2.

FIG. 4 illustrates an instance where the analysis of program code in a received data set is focused on a portion of program code of a data set that may have been classified as being suspicious by operations of the flow chart of FIG. 2. Step 410 of FIG. 4 allows a received data set to be executed. After step 410, step 420 may monitor the execution of program code in that data set as it executes. This monitoring may include looking for indicators that indicate that a particular portion of program code in the data set has been previously identified as being suspicious. In certain instances step 420 of FIG. 4 may be executed after step 270 of FIG. 2 has classified this portion of the data set as being suspicious.

Determination step 430 of FIG. 4 may then identify whether the suspicious portion of the data set is about to be executed, when yes, program may flow from step 430 to step 440 where the suspect program code may be analyzed. The analysis of the program code may include matching that program code to known malicious code. This matching may include techniques associated with deep packet inspection (DPI). Because of this malicious code in a data set may be identified without allowing suspect program code to execute. Alternatively or additionally the identification that the data set include malicious code may include matching an action performed by the program code with one or more actions that are known or are believed to be malicious.

The identification that suspect malicious program code is about to be executed or that suspect malicious code is included in a data set may include identifying that a portion of program code has been marked as being executable. As such, when program code of a data set loads a portion of memory with information/data and then marks that information/data as being executable may in itself constitute suspicious program activity. When such program code has previously been associated with suspicious activity based on memory accesses like those described in respect to FIG. 2, that program code may be associated with both a first and a second suspiciousness level.

After step 440, determination step 450 identifies whether the portion of program code matches known malicious code, when yes, program flow moves from step 450 to step 460 where that data set may be classified as being malicious. While not illustrated in FIG. 4 data sets classified as being malicious may be deleted, quarantined, or be analyzed further.

As previously mentioned program code may be associated with a different set of contextual information than a set of contextual information that is associated with analysis code that may be used to analyze the program code. As such, a set of program code may be associated with a first set of contextual information and analysis code may be associated with a second set of contextual information. These different sets of contextual information may be related to different distinct process of the program code and of a set analysis code. This may be true even when the analysis code analyzes the real-time execution of the program code. Analysis code consistent with the present disclosure may execute as a background task that is an independent process from a process associated with the execution of program code. In certain instances, this analysis code may poll memory associated with program code using techniques associated with a DBI framework. Alternatively or additionally analysis code may analyze data stored in memory by scanning the contents of memory with techniques associated with deep packet inspection (DPI). As such, analysis software may identify malicious or suspicious code via instrumentation code that matches program code contexts to criteria that is associated with suspicious code. Furthermore, analysis software may identify malicious code by matching signatures associated with known malware with data stored in memory. Based on this, determination steps 430 and/or 450 may identify suspicious and/or malicious code using techniques consistent with DBI and/or with DPI.

When determination step 450 identifies that the suspicious program code does not appear to match known malicious code, program flow moves from step 450 to step 470. Step 470 may the determine whether program code associated with the data set has completed, when yes program flow moves to step 480 where the flow chart of FIG. 4 ends. When determination step identifies that the program codes in the data set has not completed execution, program flow moves back to step 410 where the program code is allowed to continue executing.

Figure 5B:
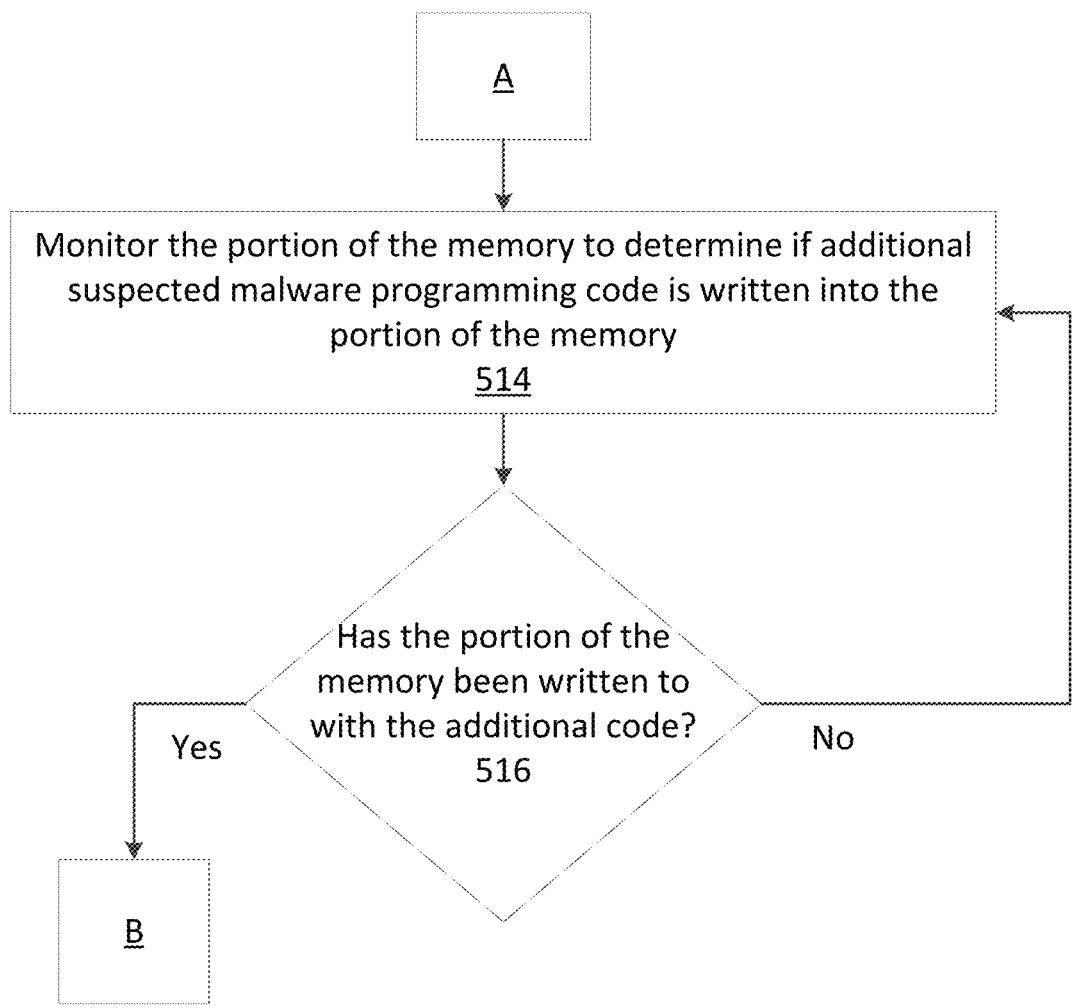

FIGS. 5a and 5b illustrate steps for using exception handling to prevent execution of suspected malware program code. Exception handling, as used herein, includes responding to anomalies or conditions that require different processing or otherwise disrupt the normal flow of execution of code or program execution. Normal flow of execution of code or program execution can include execution of code without interruptions, e.g. interruptions caused by exception handling. For example, exception handling can include one or a combination of stopping or failing to execute code and marking the code as non-executable, executable, and/or read-only.

Exception handling can be implemented using specialized programming language constructs that indicate specific conditions that trigger interrupting normal execution of code and specific functions to perform in response to occurrences of the conditions. More specifically, exception handling can be implemented through one or more exception handlers, e.g. implemented as software, that are configured to break a normal flow of execution of code and subsequently execute an exception function in response to breaking the normal flow of execution of the code. For example, an exception handler can be configured to mark suspected malicious code/memory storing the code as read-only in response to writing the code into memory, as part of performing exception handling. Exception handlers can be pre-registered and/or pre-configured to perform exception handling. For example, an exception handler can be pre-configured with an exception function to scan written code and flag the written code as malicious if it matches a malicious pattern.

At step 502, execution of suspected malware program code written into a portion of memory is prevented through exception handling by marking the code, e.g. the portion of memory that the code is written into, as non-executable. A first exception handler can mark suspected malware program code written into a portion of memory as non-executable through exception handling. For example, a first exception handler can include an exception function to label suspected malware program code as non-executable and the first exception handler can subsequently label suspected malware program code written into memory as non-executable, as part of performing exception handling. The code/memory can be automatically marked as non-executable in response to writing of the code into the memory. Specifically, as soon as code is written into memory, the memory can be marked as non-executable in order to prevent execution of the code and potential damage or occurrences of threats caused by execution of the code.

Programming code can be identified as suspected malware programming code using an applicable method and an applicable system, such as the methods and systems described herein. For example, programming code can be identified as suspected malware programming code based on an identifier that indicates that at least a portion of a data set includes the suspected malware programming code. In another example, programming code can be identified as suspected malware programming code based on marking of memory that the code is written into as including executable code. Additionally, programming code can be identified as suspected malware programming code in response to writing of the programming code into memory. Specifically, once programming code is written into memory the code can be labeled as suspected malware programming code and subsequently analyzed to determine whether the code is actually suspected malware programming code.

At step 504, the portion of the memory that the suspected malware programming code is written into is marked as read-only through exception handling. Specifically, either the first exception handler or another exception handler can mark the portion of the memory as read-only. The portion of the memory that the suspected malware programming code is written into can be marked as read-only at step 504 simultaneously with the marking of the code as non-executable at step 502. As will be discussed in greater detail later, marking the memory as read-only, e.g. as part of exception handling, can subsequently assist in preventing malicious users or hackers from writing new malware code into memory to avoid detection.

Further, at step 504, the portion of the memory that the suspected malicious code is written into can be marked as read-only in response to writing of new code into the portion of the memory. The portion of memory can be marked as read-only in response to the writing of code into the memory, regardless of whether the code is identified as suspected malware programming code. Additionally, the portion of the memory that the suspected malware programming code is written into can be marked as read-only in response to the writing of code identified as the suspected malware programming code into the memory. Further, the portion of memory can be marked as read-only in response to an attempt to execute the code from the portion of the memory.

At step 506, the suspected malware programming code is scanned to identify whether the suspected malware programming code exhibits a malicious pattern. An applicable scanner for identifying whether code exhibits a malicious pattern, such as the malicious code scanners described herein, can identify whether the suspected malware programming code exhibits a malicious pattern. A malicious pattern can be identified or generated based on previously identified malware programming code or one or more known sets of malware programming code. For example, a malicious pattern can include operations performed during execution of previously identified malware programming code. Referring back to step 502, as the suspected malware programming code is marked as non-executable, execution of the suspected malware programming code from the memory can be halted or stopped as the suspected malware programming code is scanned to determine whether it exhibits a malicious pattern. Accordingly, potential threats caused by execution of suspected malware programming code are reduced or otherwise eliminated during step 506 of scanning the suspected malware programming code as the code is not actually executed from the memory on a machine containing or accessing the memory.

At determination step 508, it is determined whether the suspected malware programming code exhibits the malicious pattern. An applicable scanner, such as the malicious code scanners described herein, can determine whether the malware programming code exhibits the malicious pattern. If it is determined at step 508 that the suspected malware programming code does not exhibit the malicious pattern, then the flow proceeds to step 512 where execution of the suspected malware programming code is allowed, e.g. through exception handling. More specifically, if it is determined at step 508 that the suspected malware programming code does not exhibit the malicious pattern, then the marking of the suspected malware programming code can be changed from non-executable to executable. Accordingly, the suspected malware programming code can be effectively identified as non-malware programming code and can be freely executed from the memory. This helps to ensure, e.g. through exception handling, that suspected malware programming code is not executed from the memory until it is determined whether the code is actually malware programming code. Further, at step 512, the code can be marked from read-only to writeable in response to determining the code fails to exhibit the malicious pattern at step 508.

In specific embodiments, even if the code is determined, at step 508, to not exhibit the malicious pattern, the code/memory may still be kept as non-executable, contrary to what is shown at step 512 in FIG. 5A. More specifically, the marking of the code as non-executable can still be kept as non-executable in response to determining the code fails to exhibit the malicious pattern. This can allow the code to be analyzed at a later time while still minimizing or otherwise eliminating risks caused by execution of the code. Specifically, the code can be analyzed at a later time, e.g. when more malicious patterns are known, to allow making of a more informed decision as to whether the code is actually malware programming code.

If it is determined at step 508 that the suspected malware programming code exhibits the malicious pattern, then the flow proceeds to step 510, where execution of the suspected malware programming code is further prevented, e.g. through exception handling, in response to the determination that the code matches the malicious pattern. More specifically, if it is determined at step 508 that the suspected malware programming code does exhibit a malicious pattern, then the marking of the suspected malware programming code as non-executable can remain unchanged or otherwise kept as non-executable. Accordingly, the suspected malware programming code can be effectively identified as malware programming code and execution of the code can be limited or otherwise stopped in response to identification of the code as actual malware programming code. Additionally, at step 510, the code can be flagged as malware programming code to further prevent execution of the code. After step 510 the flow ends.

After step 512, the flow proceeds to step 514. At step 514, the portion of memory is monitored to determine if additional suspected malware programming code is written into the portion of the memory containing the previously identified suspected malware programming code. Additional suspected malware programming code can include new suspected malware programming code written over all or a portion of the previously identified suspected malware programming code. Further, additional suspected malware programming code can include additional code written into the portion of the memory without writing over the previously identified suspected malware programming code already written to the portion of memory.

Next, at determination step 516, it is determined whether the additional suspected malware program code has been written into the portion of the memory based on the monitoring of the portion of the memory at step 514. If it is determined that the suspected malware programming code is not written into the portion of the memory, then the flow continues back to step 514, where the portion of the memory is monitored. Conversely, if it is determined that the additional suspected malware programming code is written into the portion of the memory, then the flow forms a loop and continues back to step 502. In particular, this loop can be triggered by the marking of the portion of memory as read-only, e.g. through exception handling, and the fact that the additional suspected malware programming code is written into the memory despite the marking of the portion of the memory as read-only. In turn, this can aid in preventing or limiting malicious users or hackers from writing new malware code into memory to avoid detection At step 502, the additional suspected malware programming code is marked as non-executable, e.g. through exception handling. The additional suspected malware programming code can be marked as non-executable at step 502, in response to the additional suspected malware programming code being written into the portion of the memory. At step 504, the portion of the memory that the additional suspected malware programming code is written into can once again be marked as read-only. The portion of the memory can be marked as read-only in response to the writing of the additional suspected malware programming code into the portion of the memory.

The flow then continues back to step 506, then determination step 508, and subsequently either one of steps 510 and 512. Specifically, the additional suspected malware programming code can be scanned to identify whether the additional suspected malware programming code is actual malware programming code. Subsequently, the additional suspected malware programming code can be kept marked as non-executable or changed to executable based on whether the additional suspected malware programming code is identified as actual malware programming code at step 508.

The flow can then end or continue back to step 514, where the portion of the memory is then monitored once again to identify when further additional suspected malware code is written into the portion of the memory. This process can continue to repeat itself, thereby continuing to prevent a malicious user or hacker from writing malware programming code into the portion of the memory, e.g. through exception handling. This is advantageous as injected malware programming code can be contained before the injected malware programming code is actually executed from the machine and subsequently exposes a computer system to risk as a result of the execution of the code.

Figure 6:
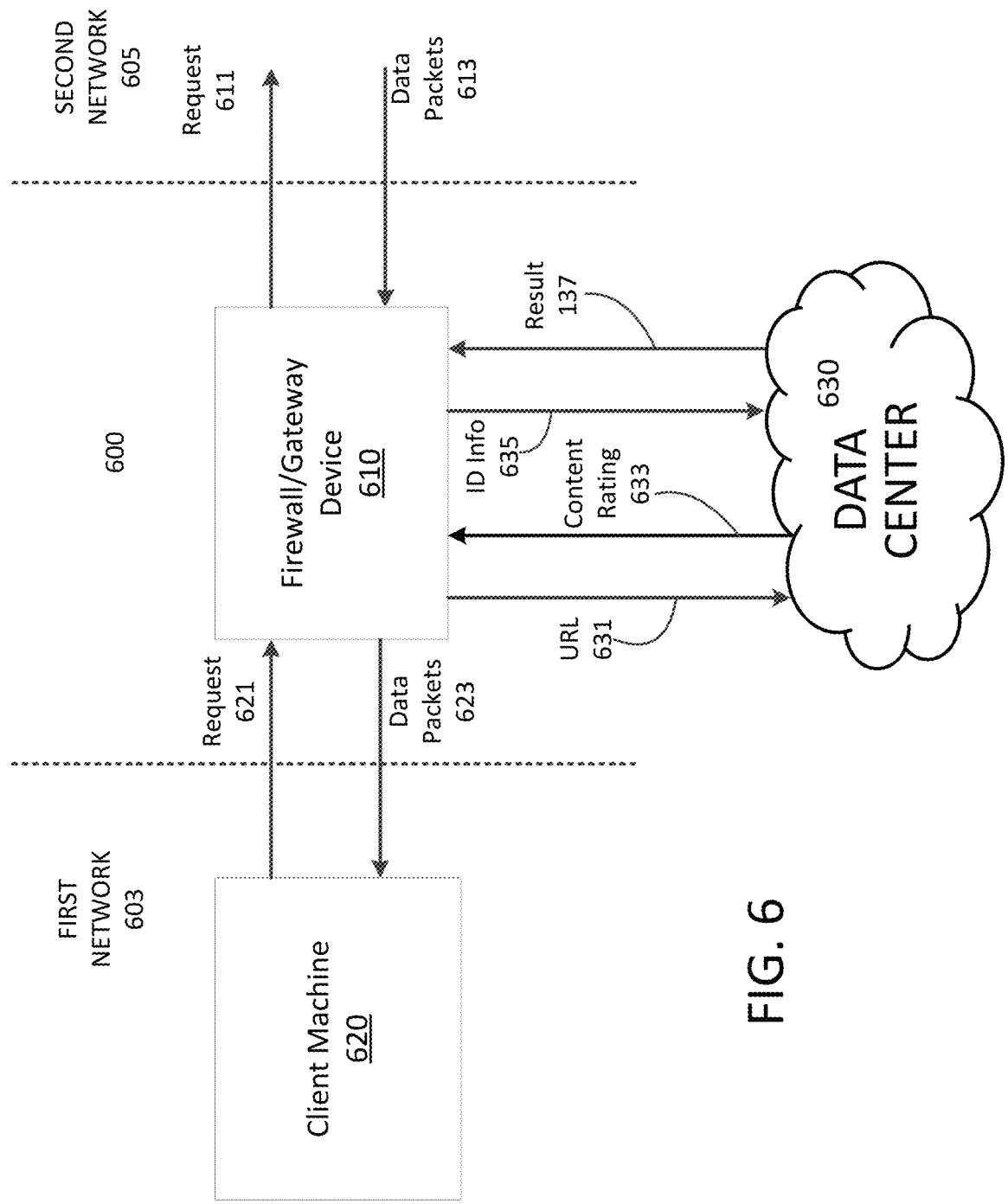
FIG. 6 illustrates one embodiment of a networked system.

FIG. 6 illustrates one embodiment of a networked system. The system 600 includes a firewall/gateway device 610 coupled between a first network 603 and a second network 605. In some embodiments, the first network 603 is a private network (e.g., a local area network (LAN) of a company), whereas the second network 605 includes a public network (e.g., the Internet). The firewall/gateway device 610 is further coupled to a datacenter 630, which may be within either the first network 603, the second network 605, or a third network. The datacenter 630 includes at least one computing machine and at least one computer-readable storage medium. The datacenter 630 may also be referred to as a Cloud or Cloud computing environment. In general, the computing machine of the datacenter 630 is operable to perform security screening related tasks, such as looking up content rating of webpages, evaluating and determining content rating of webpages, performing signature matching (such as pattern matching, hash comparison, etc.), deep packet inspection (DPI), or observe the behavior of program code as it executes, etc. The computer-readable storage medium/memory of the datacenter 630 may store security screening related information, such as content ratings of webpages and their associated path (e.g., Universal Resource Locator (URL), patterns or signatures of malware (e.g., virus, spyware, etc.). Such computer-readable memories may also store information relating to behavior patterns that may be associated with or that characterize potentially malicious code. The computer-readable storage medium may include one or more databases made of various media, such as ROM, CDs, magnetic tapes, disk drives, Flash drives, optical drives, etc. In some embodiments, the security screening related information may be updated periodically to include updated content ratings of existing webpages, content ratings of new webpages, signatures of newly identified malware, etc. Such updates may be performed manually by an administrator of the datacenter, or automatically by downloading from another server of a network security company that provides such updates. Furthermore, the datacenter may include numerous computers directed to performing DPI or to analyzing program code according to the techniques of the present disclosure. As such, a datacenter residing in the Cloud may include multiple "Sandboxing" computers.

FIG. 6 illustrates is at least one client machine 620 in the first network 603. Note that the first network 603 may include additional client machines. The client machine 620 includes a computing device with network accessing capability, such as a personal computer, a server, a cellular telephone, a laptop computer, a personal digital assistant (PDA), a smartphone, etc. To illustrate the operations in the system 600, one example is discussed in details below.

In some embodiments, the client machine 620 sends a request 621 for a file to the firewall/gateway device 610. For instance, a user of the client machine 620 may have clicked on a hyperlink in a webpage to request certain content, such as another webpage, a document, a song, a video, a picture, an executable of a software application, etc. The gateway device 610 may then forward the request 611 for the file to the second network 605. Substantial simultaneously, the gateway device 610 may also forward the path 631 of the file (e.g., the URL of the file) to the datacenter 630. Using the path 631 of the file, the datacenter 630 may look up the content rating of the file from its computer-readable storage medium/memory. If the datacenter 630 successfully finds the content rating of the file, then the datacenter 130 may send the content rating 633 to the gateway device 610. Based on the content rating 633, the gateway device 610 may decide whether to block the file from the client machine 610. For example, if the content rating 633 indicates that the file is in a prohibited category (e.g., pornographic, violent, etc.) according to a predetermined policy of the first network 603, then the gateway device 610 may block the file. For example, the gateway device 610 may simply discard data packets of the file instead of forwarding the data packets to the client machine 620. The gateway device 610 may also hold at least one data packet associated with the file until datacenter 630 has sent a content rating or result to gateway device 610.

Alternatively or additionally, a content rating may be associated with an authorization level and an access policy. In such instances, a user of a client device may be prohibited from accessing certain content when that user is not authorized to view or receive that content based on that user not being authorized to receive or view that content based on a policy.

In response to the request 611 for the file, a host or a server in the second network 605 may send data packets 613 of the file to the gateway device 610. The gateway device 610 may forward the data packets 623 to the client machine 620 as the data packets are received at the gateway device, provided the gateway device 610 has not received the content rating of the file from the datacenter 630 yet or the gateway device 610 has determined that the content rating of the file is not in a prohibited category. Typically, in some embodiments, when the datacenter 630 can successfully find the content rating of the file, the datacenter 630 can send the content rating 633 to the gateway device 610 before all data packets of the file are received at the gateway device.

Furthermore, as the gateway device 610 receives the data packets 613 from the second network 605, the gateway device 610 may generate an identification of the file based on the partial information of the file provided by the data packets 613 received. In some embodiments, the gateway device 610 computes a partial hash from the data packets 613 received and uses the partial hash as an identification of the file. The gateway device 610 then sends the identification 635 of the file to the datacenter 630. In some embodiments, the gateway device 610 may send additional information with the identification of the file 635 to the datacenter 630. Such information may include URL of the file, destination server Internet Protocol (IP) address, hostname, etc. In some embodiments, the gateway device 610 may send identifications of some predetermined types of files to the datacenter 630 in order to improve efficiency of the screening process. For instance, the gateway device 610 may send only identifications of executables of software applications to the datacenter 630 for security screening because malware are most likely found in executables.

Using the identification 635 from the gateway device 610, the datacenter 630 determines if there is a high likelihood that the file contains malware. In some embodiments, the datacenter 630 performs signature matching (e.g., pattern matching, hash comparison, etc.) on the identification 635. The datacenter 630 may store a set of signatures previously identified to be signatures of files that contain malware. The datacenter 630 may perform reassemble-free deep packet inspection (DPI) on the identification 635 to determine if the identification 635 matches any of the signatures stored. The datacenter 630 returns the result 637 of the signature matching to the gateway device 610. Because part of the security screening tasks is performed by the datacenter 630, which is commonly referred to as a cloud, the security screening may also be referred to as cloud-based gateway security screening or cloud-based gateway anti-virus screening. Alternatively or additionally computers at the datacenter may analyze program code in a manner consistent with the content of FIGURES of the present disclosure.

When the result 637 from the datacenter 630 indicates that there is a malware signature match or indicates that program code associated with the file performs suspicious activity, the gateway device 610 may then block the file from being sent to the client machine 620. For instance, the gateway device 610 may simply discard the data packets not yet forwarded to the client machine 620, instead of continuing to forward the data packets to the client machine 620. The gateway device 610 may also send a message or a warning to the client machine 620 to inform the client machine 620 of the decision. Otherwise, if there is no match or suspicious activity observed, then the file is not likely to contain malware, and thus, the gateway device 610 continues to forward data packets of the file to the client machine 620 until all data packets of the file have been forwarded.

FIG. 7A illustrates one embodiment of a method to process a file request at a firewall/gateway device. The method may be performed by processing logic that may comprise hardware (e.g., circuitry, dedicated logic, programmable logic, processing cores, etc.), software (such as instructions run on a processing core), firmware, or a combination thereof.

Initially, processing logic of a gateway device receives a request for a file from a client machine (processing block 710). Then processing logic of the gateway device sends a path of the file, such as an URL, to a datacenter to request content rating of the file, if available (processing block 712). Substantially simultaneously, processing logic forwards the request for the file to a second network, such as the Internet, to retrieve the file (processing block 714).

FIG. 7B illustrates one embodiment of a method to perform cloud-based firewall/gateway anti-virus scanning. The method may be performed by processing logic that may comprise hardware (e.g., circuitry, dedicated logic, programmable logic, processing cores, etc.), software (such as instructions run on a processing core), firmware, or a combination thereof.

Processing logic of the gateway device receives data packets of the file requested (processing block 720). The data packets received so far may constitute part of the file or the entire file. Processing logic generates an identification of the file using information from the data packets received (processing block 722). Then processing logic sends the identification, and optionally, additional information, to the datacenter (processing block 724). The additional information may include URL of the file, destination server Internet Protocol (IP) address, hostname, etc. The datacenter may perform signature matching on the identification using signatures of previously identified malware.

As processing logic generates the identification, processing logic also forwards the data packets received to the client machine (processing block 730). Then processing logic determines if it has received any result from the datacenter (processing block 732). If not yet, then processing logic returns to processing block 730 to continue forwarding data packets received to the client machine. Otherwise, if processing logic receives the result from the datacenter, the processing logic determines if the file should be blocked based on the result (processing block 734). If the result indicates there is no match, then the file is not likely to contain malware, and thus, processing logic returns to processing block 730 to continue forwarding data packets received to the client machine. Otherwise, if the result indicates that there is a match between the identification of the file and a predetermined malware signature, then the file is likely to contain malware, and thus, processing logic blocks the file from the client machine by stopping transmission of additional data packets of the file to the client machine (processing block 736). The gateway device may further send a message or a warning about this file to the client machine.

Figure 8A:
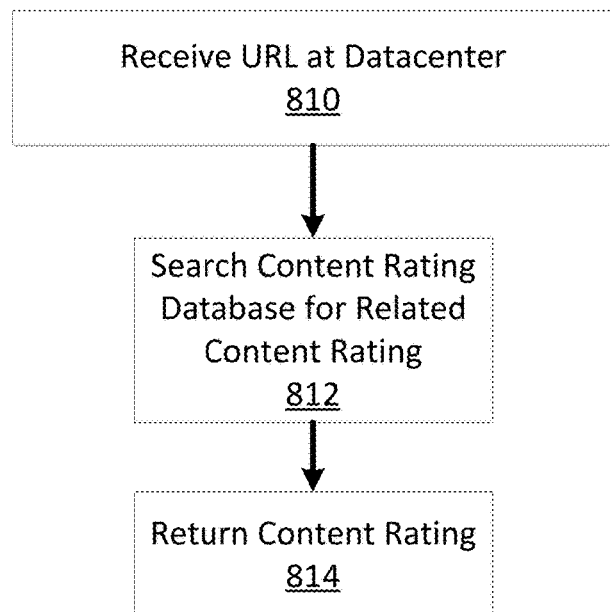
FIG. 8A illustrates one embodiment of a method to determine content rating of a file at a datacenter.

FIG. 8A illustrates one embodiment of a method to determine content rating of a file at a datacenter. The method may be performed by processing logic that may comprise hardware (e.g., circuitry, dedicated logic, programmable logic, processing cores, etc.), software (such as instructions run on a processing core), firmware, or a combination thereof.

Processing logic of a datacenter receives a path of a file, such as an URL, from a gateway device (processing block 810). Then processing logic searches a content rating database of the datacenter for a content rating associated with the URL (processing block 812). Processing logic sends the content rating associated with the URL to the gateway device, if available (processing block 814).

Figure 8B:
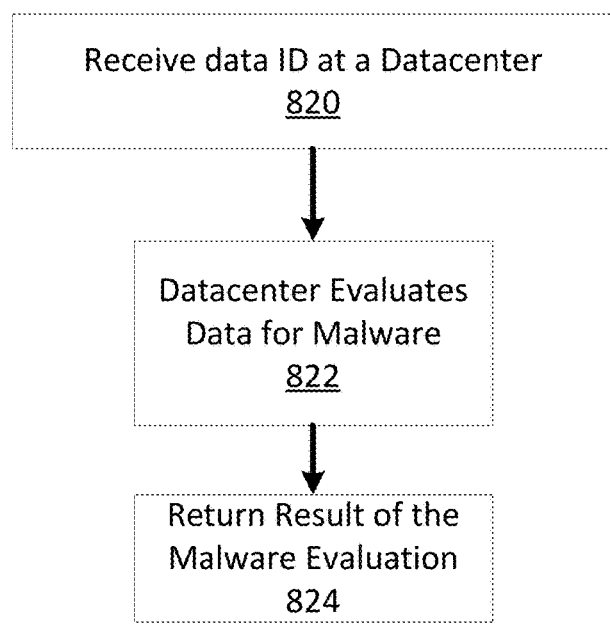
FIG. 8B illustrates one embodiment of a method to screen for virus at a datacenter.

FIG. 8B illustrates one embodiment of a method to screen for virus at a datacenter. The method may be performed by processing logic that may comprise hardware (e.g., circuitry, dedicated logic, programmable logic, processing cores, etc.), software (such as instructions run on a processing core), firmware, or a combination thereof.

Processing logic of the datacenter receives an identification of a file from the gateway device (processing block 820). The identification may be generated from data packets of the entire file or from a subset of data packets of the file. In some embodiments, the identification is generated by computing a partial hash of a subset of data packets of the file. Then, processing logic of the datacenter may perform signature matching (e.g., pattern matching, hash comparison, etc.) on the identification using predetermined signatures of malware from a signature database of the datacenter (processing block 822). This processing logic may also perform a run-time analysis of program code associated with the file when identifying whether program code associated with the file performs suspicious activity. Finally, processing logic may return result of the signature matching or program code analysis to the gateway device (processing block 824). The gateway device may decide whether to block the file or not based on the result of the signature matching from the datacenter as discussed above. Alternatively, a firewall/gateway device may block the file based on the result without making an additional decision.

Figure 9:
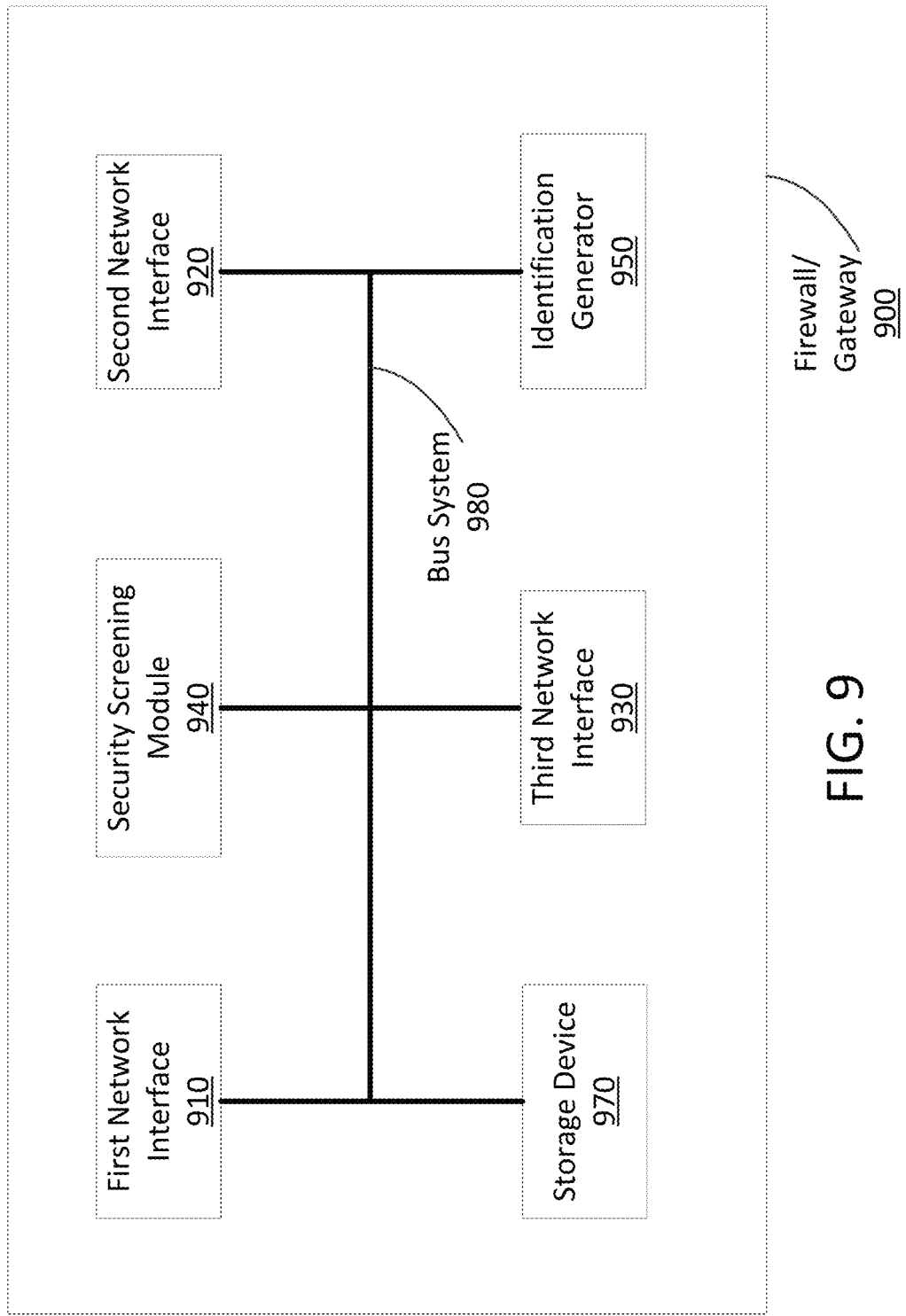
FIG. 9 illustrates one embodiment of a firewall/gateway device.

FIG. 9 illustrates one embodiment of a firewall/gateway device. The gateway device 900 includes a first network interface 910, a second network interface 920, a third network interface 930, a security screening module 940, a storage device 970, and an identification generator 950, coupled to each other via a bus system 960.

In some embodiments, the first network interface 910 couples to a private network and the client machines therein. For instance, the private network may include a LAN of an entity (e.g., a company, a government, etc.). The second network interface 920 couples to a public network, which may include the Internet. The third network interface 930 couples to a datacenter, such as the one illustrated in FIG. 10.

In some embodiments, the storage device 970 stores content ratings of a number of webpages and/or a number of predetermined signatures of previously identified malware. These webpages may be frequently requested by client machines in the private network, and hence, storing their content ratings locally in the gateway device 900 may speed up security screening. Likewise, the signatures stored in the storage device 970 may be associated with malwares that frequently appear in data directed to the private network. Therefore, storing these signatures locally also speeds up security screening.

The gateway device 900 further includes a security screening module 940. The security screening module 940 may be operable to perform various security screening operations on data passing through the first network interface 910 into the private network. For example, the security screening module 940 may perform content rating evaluation of webpages retrieved, signature matching between the incoming data and predetermined signatures or patterns, etc. In addition, the security screening module 940 may use information (e.g., content ratings of webpages, signature matching results, etc.) from the remote datacenter to determine if an incoming file should be blocked from the client machines in the private network. Details of some embodiments of the interaction between the datacenter and the gateway device 900 have been discussed above.

In some embodiments, the identification generator 950 is operable to generate an identification of a file using some or all of the data packets of the file at the gateway device 900. In other words, the data packets used may or may not constitute the entire file. For example, the identification generator 950 may compute a partial hash of the data packets of a file received so far and use the partial hash as the identification of the file. The identification generated may be forwarded via the third network interface 930 to the datacenter for signature matching or may be forwarded to the security screening module 940 for signature matching locally. If there is a match between the identification and a predetermined malware signature, then the security screening module 940 can signal the first network interface 910 to stop forwarding data packets of the file to the private network. Otherwise, the first network interface 910 may continue forwarding data packets of the file to the private network.

Figure 10:
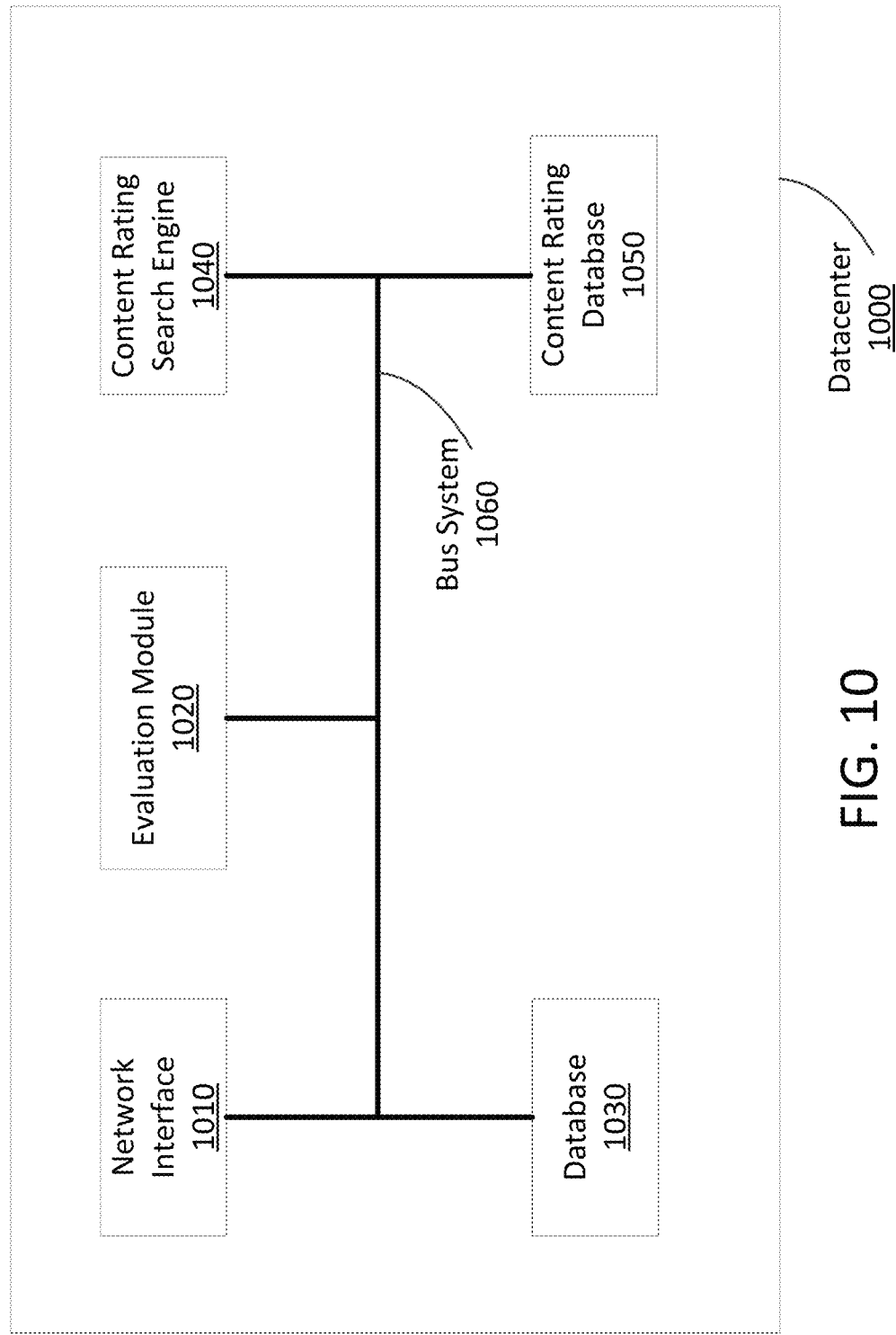
FIG. 10 illustrates one embodiment of a datacenter.

FIG. 10 illustrates one embodiment of a datacenter. The datacenter 1000 includes a network interface 1010, a signature matching module 1020, a signature database 1030, a content rating search engine 1040, and a content rating database 1050, coupled to each other via a bus system 1060. In some embodiments, the network interface 1010 couples to a gateway device, such as the one illustrated in FIG. 9. The network interface 1010 may receive various security screening data or other related information from the gateway device, such as an URL of a file, an identification of a file, etc. Using such information, the datacenter 1000 may perform some of the security screening tasks for the gateway device. In other words, the gateway device offloads part of the security screening workload to the datacenter 1000, and thus, is able to leverage the additional storage capacity and processing power of the datacenter 1000 to track additional content ratings, malware signatures, etc. As such, a datacenter residing in the Cloud that performs methods consistent with the present disclosure, may provide users with the ability to protect their electronic devices from malicious code without those users or their employers having to implement or deploy DPI scanners or "Sandboxing" computers in a computer network that is local to computers that reside at that local computer network.

In some embodiments, the signature matching module 1020 performs signature matching on file identification received from the client machine. The signature matching module 1020 retrieves predetermined malware signatures from the signature database 1030, and compares the malware signatures against the signature received by pattern matching, hash comparison, etc. In some embodiments, the signature matching module 1020 performs deep packet inspection (DPI) on the signature in the comparison. For instance, the signature matching module 1020 may use Deterministic Finite Automaton (DFA) or any suitable state machine to perform DPI. Other signature matching algorithms may be used in different embodiments.

In addition to signature matching, the datacenter 1000 may perform content rating look-up using the content rating search engine 1040 and the content rating database 1050. In some embodiments, the client machine may send a path of the file requested to the datacenter 1000. Using the path of the file, the content rating search engine 1040 searches for the content rating associated with the path in the content rating database 1050. If the content rating is found, the datacenter 1000 returns the content rating via the network interface 1010 to the client machine.

Note that the signature database 1030 and the content rating database 1050 may be updated, either manually or automatically by downloading updates from a security service provider. For example, content ratings of new webpages, updated content rating of existing webpages, signatures of newly found malware, updated signatures of previously found malware, etc., may be input to the content rating database 1050 and the signature database 1030, respectively, from time to time (e.g., once a week, once a month, etc.) or at an on-demand basis (e.g., at the request of a system administrator).

While the foregoing descriptions of FIGS. 6-10 discuss operations that may be performed on files or webpages that are requested by client devices, any data accessed or requested by a client computing device may be analyzed using methods consistent with the present disclosure.

Figure 11:
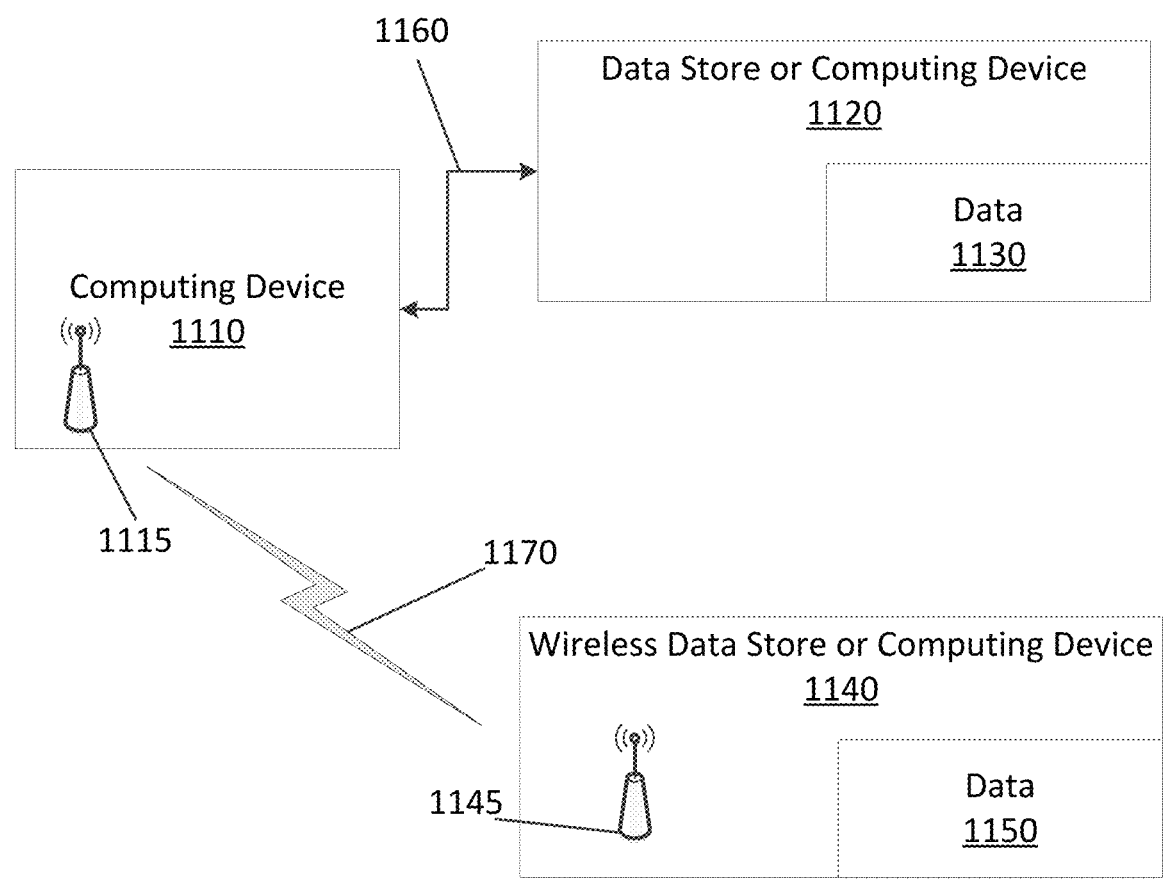
FIG. 11 illustrates a computing device accessing data at stored at a data store or at a computing device.

FIG. 11 illustrates a computing device accessing data at stored at a data store or at a computing device. FIG. 11 includes computing device 1110, data store/computing device 1120, and wireless data store/computing device 1140. Data store/computing device 1120 includes data 1130 that computing device 1110 may access via communication connection 1160. Data store/computing device 1140 includes data 1150 that computing device 1110 may access via wireless interconnect 1115, wireless signal 1170, and wireless interconnect 1145 at the wireless data store/computing device. Computing device 1110 may be a computer that actually retrieves data 1140/1150 or computing device 1110 may be a firewall or gateway that retrieves data 1140/1150 for another computing device. Methods consistent with the present disclosure may be performed by any type of computing device 1110 including, yet not limited to a personal computer, a notebook computer, a phone, a firewall, a gateway or other device. In certain instances after a data set is flagged as possibly being associated with malware, the data set and other information may be sent to another computer for further analysis. As such, computing devices may identify suspicious code without allowing that code to complete executing locally, thus protecting computing devices from the devastating effects of malware.

As such, processes performed by a program may be monitored by a processor executing code that analyzes what the application program does by reviewing the context information passed from the instrumentation code. This context information includes, yet is not limited to the content of certain computer registers, parameters associated with a process performed by a processor executing code of the program, the content of certain memory locations, information that relates to the state of a memory, or information relating to the allocation of memory. Analysis of an application at runtime using binary instrumentation makes it possible to gain insight into the behavior of a particular program including internal CPU registers and memory state of the program throughout its execution. As such, the detection of malware by DBI highlights one of the key differences between DBI and conventional static binary analysis.

Note that the systems and methods consistent with the present disclosure may identify the presence of malware loaded into executable memory without requiring suspect portions of code to be executed. Alternatively or additionally, program code can be executed while it is monitored to see if that program code actually does perform a malicious action. In an instance when an area of program code has been identified as possibly including malicious code, that suspect area of program code may be scanned as soon as it is loaded into executable memory. For example, the execution of program code may be interrupted (paused) while the content of that program code is scanned for malicious content. The scanning of suspect program code may be performed by any technique known in the art, including, yet not limited to techniques associated with DPI. Method and systems consistent with the present disclosure, therefore, may allow data sets to be analyzed more quickly for malicious code as portions of program code may be executed without all of the bytes of the program code to be scanned for malware. Instead, only certain portions of program code in a data set may be scanned by a malware scanning engine. As such, malware scanning techniques like DPI may be combined with instrumentation code that observes the actions of program code to see whether that program code performs a malicious act.

Figure 12:
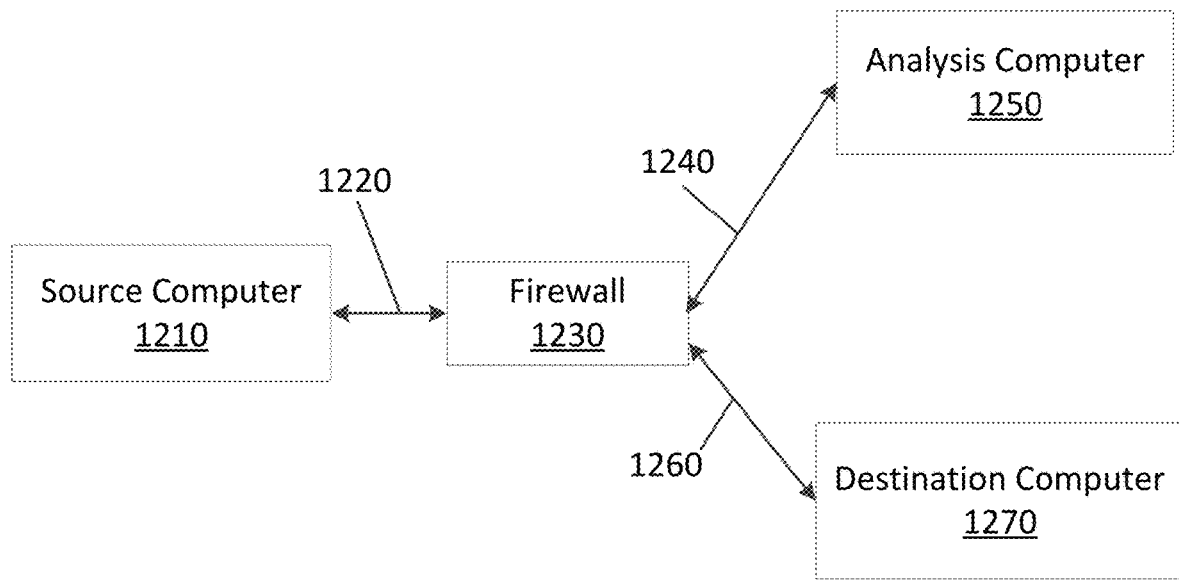
FIG. 12 illustrates a firewall communicating with an analysis computer when data packets sent from a source computer are received by and sent from the firewall.

FIG. 12 illustrates a firewall communicating with an analysis computer when data packets sent from a source computer are received by and sent from the firewall. In instances where potential malware can be received in packetized data communications, one or more computing devices may perform functions relating to identifying whether a data packet set includes malware. FIG. 12 includes a source computer 1210, a firewall 1230, an analysis computer 1250, and a destination computer 1270 that may prevent malware from reaching the destination computer. FIG. 12 also includes communications 1220 sent to/from the destination computer 1270 via firewall 1230, communications 1260 sent to/from the destination computer 1270, and communications 1250 sent between the firewall 1230 and the analysis computer 1250. Note that communications 1220 may be transmitted over a computer network such as the Internet, that communications 1260 may be sent over computer network interfaces at the firewall 1230 and at the destination computer 1260, and that communications 1240 may be sent between the firewall and the analysis computer via computer network interfaces at the firewall 1230 and the analysis computer 1250. Note also that any of the computer networks over which communications 1220, 1240, and 1260 are sent may include wired or wireless network interfaces. Analysis computer 1250 may also be remote from firewall 1230 and analysis computer 1250 may reside in the Cloud. Network interfaces associated with the present disclosure may include any form of wired or wireless network interface known in the art.

The various components of FIG. 12 may implement functions associated with the receipt and analysis of computer data that may have been requested by destination computer 1270 and have been provided by source computer 1210. In such instances, firewall 1230 and analysis computer 1250 may perform functions consistent with receiving packets, providing messages, or analyzing computer data sent from source computer 1210 when identifying whether the requested downloaded data includes malicious content. As such fire wall 1230 and analysis computer 1250 may perform functions consistent with the present disclosure, including those functions described in respect to the FIGURES of the present disclosure.

Figure 13:
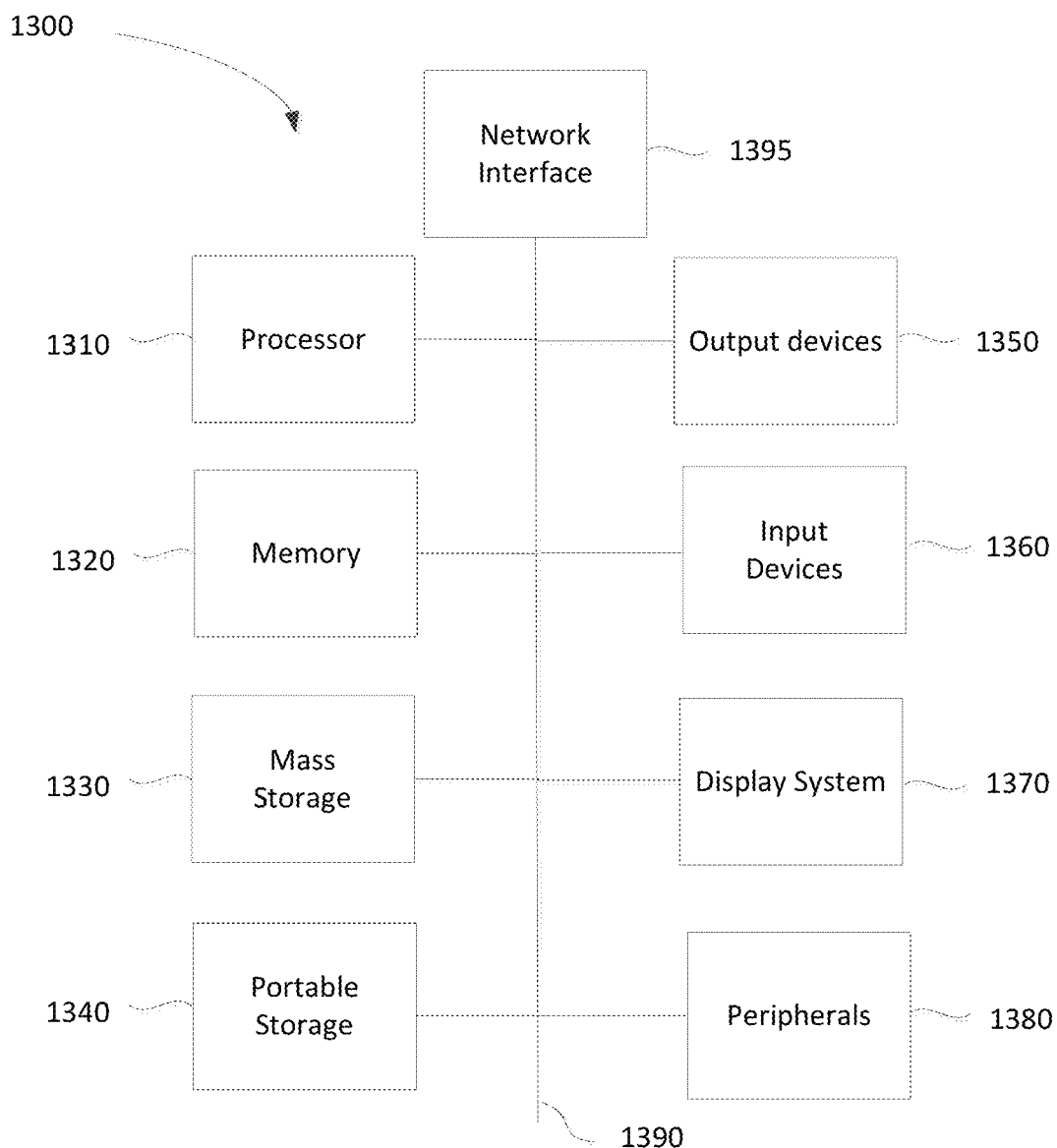
FIG. 13 illustrates a computing system that may be used to implement an embodiment of the present invention.

FIG. 13 illustrates a computing system that may be used to implement an embodiment of the present invention. The computing system 1300 of FIG. 13 includes one or more processors 1310 and main memory 1320. Main memory 1320 stores, in part, instructions and data for execution by processor 1310. Main memory 1320 can store the executable code when in operation. The system 1300 of FIG. 13 further includes a mass storage device 1330, portable storage medium drive(s) 1340, output devices 1350, user input devices 1360, a graphics display 1370, peripheral devices 1380, and network interface 1395.

The components shown in FIG. 13 are depicted as being connected via a single bus 1390. However, the components may be connected through one or more data transport means. For example, processor unit 1310 and main memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 can store the system software for implementing embodiments of the present invention for purposes of loading that software into main memory 1320.

Portable storage device 1340 operates in conjunction with a portable non-volatile storage medium, such as a FLASH memory, compact disk or Digital video disc, to input and output data and code to and from the computer system 1300 of FIG. 13. The system software for implementing embodiments of the present invention may be stored on such a portable medium and input to the computer system 1300 via the portable storage device 1340.

Input devices 1360 provide a portion of a user interface. Input devices 1360 may include an alpha-numeric keypad, such as a keyboard, for inputting alpha-numeric and other information, or a pointing device, such as a mouse, a trackball, stylus, or cursor direction keys. Additionally, the system 1300 as shown in FIG. 13 includes output devices 1350. Examples of suitable output devices include speakers, printers, network interfaces, and monitors.

Display system 1370 may include a liquid crystal display (LCD), a plasma display, an organic light-emitting diode (OLED) display, an electronic ink display, a projector-based display, a holographic display, or another suitable display device. Display system 1370 receives textual and graphical information, and processes the information for output to the display device. The display system 1370 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1380 may include any type of computer support device to add additional functionality to the computer system. For example, peripheral device(s) 1380 may include a modem or a router.

Network interface 1395 may include any form of computer interface of a computer, whether that be a wired network or a wireless interface. As such, network interface 1395 may be an Ethernet network interface, a BlueTooth™ wireless interface, an 802.11 interface, or a cellular phone interface.

The components contained in the computer system 1300 of FIG. 13 are those typically found in computer systems that may be suitable for use with embodiments of the present invention and are intended to represent a broad category of such computer components that are well known in the art. Thus, the computer system 1300 of FIG. 13 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, FLASH memory, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for performing analysis in a cloud computing environment, the method comprising:
   receiving information from a computing device via a computer network interface;
   accessing computer data associated with the information received from the computing device, the accessed computer data including program code instructions executable by a processor;
   injecting instructions associated with instrumentation code into the accessed computer data, wherein operation of the instrumentation code is transparent to the program code instructions and the operation of the instrumentation code identifies contextual information relating to memory accesses performed by execution of the program code instructions;
   performing an analysis on the memory access contextual information when the instructions associated with the instrumentation code are executed, the analysis identifying a suspicious behavior associated with the memory accesses and a condition associated with the suspicious behavior;
   initiating operation of a first set of exception handling program code to label the program code as non-executable based on the condition;
   sending a message to the computing device based on the suspicious behavior identification, wherein a remaining portion of the computer data accessed is blocked from being sent to a second computing device based on the message being received by the computing device;
   allowing further execution of the program code according to the first set of exception handling program code based on an identification that a first pattern of operations of the program codes does not match a pattern of operations of a set of malware; and
   identifying based on a second analysis performed on additional memory access contextual information that a second pattern of operations of the program code matches the pattern of operation of the set of malware.

2. The method of claim 1, wherein the information received from the computing device is associated with a web page.

3. The method of claim 2, wherein the information received from the computing device is a universal resource locator that identifies the web page.

4. The method of claim 1, wherein the information received from the computing device is associated with a computer file.

5. The method of claim 1, wherein:
   a request to receive the accessed computer data was received by the computing device from the second computing device before the information was received from the computing device,
   the computing device also accesses the accessed computer data, and
   the computing device provides at least a portion of the accessed computer data to the second computing device without sending the remaining portion of the requested computer data to the second computing device.

6. The method of claim 5, further comprising retrieving information associated with the requested computer data, wherein the retrieved information includes at least one of a content rating or a signature associated with a known set of malware.

7. The method of claim 1, wherein a computer in the cloud computing environment performs the analysis on the memory access contextual information.

8. The method of claim 7, wherein the computer in the cloud computing environment executes the instructions associated with the instrumentation code when the analysis is performed.

9. A non-transitory computer readable medium having embodied thereon a program executable by a processor for performing a method for performing an analysis in a computing environment, the method comprising:
   receiving information from a computing device via a computer network interface;
   accessing computer data associated with the information received from the computing device, the accessed computer data including program code instructions executable by a processor;
   injecting instructions associated with instrumentation code into the accessed computer data, wherein operation of the instrumentation code is transparent to the program code instructions and the operation of the instrumentation code identifies contextual information relating to memory accesses performed by execution of the program code instructions;
   performing an analysis on the memory access contextual information when the instructions associated with the instrumentation code are executed, the analysis identifying a suspicious behavior associated with the memory accesses and a condition associated with the suspicious behavior;
   initiating operation of a first set of exception handling program code to label the program code as non-executable based on the condition;
   sending a message to the computing device based on the suspicious behavior identification, wherein a remaining portion of the computer data accessed is blocked from being sent to a second computing device based on message being received by the computing device;
   allowing further execution of the program code according to the first set of exception handling program code based on an identification that a first pattern of operations of the program codes does not match a pattern of operations of a set of malware; and
   identifying based on a second analysis performed on additional memory access contextual information that a second pattern of operations of the program code matches the pattern of operation of the set of malware.

10. The non-transitory computer readable medium of claim 9, wherein the information received from the computing device is associated with a web page.

11. The non-transitory computer readable medium of claim 10, wherein the information received from the computing device is a universal resource locator that identifies the web page.

12. The non-transitory computer readable medium of claim 9, wherein:
 a request to receive the accessed computer data was received by the computing device from the second computing device before the information was received from the computing device,
 the computing device also accesses at least a portion of the accessed computer data, and
 the computing device provides the at least portion of the accessed computer data to the second computing device without sending the remaining portion of the requested computer data to the second computing device.

13. The non-transitory computer readable medium of claim 12, the program further executable to retrieve information associated with the requested computer, wherein the retrieved information includes at least one of a content rating or a signature associated with a known set of malware.

14. The non-transitory computer readable medium of claim 9, wherein a computer in a cloud computing environment performs the analysis on the memory access contextual information.

15. The non-transitory computer readable medium of claim 14, wherein the computer in the cloud computing environment executes the instructions associated with the instrumentation code when the analysis is performed.

16. A system for performing analysis in a cloud computing environment, the system comprising:
 a firewall that receives computer data requested by a client device of a first computer network; and
 an analysis computer physically isolated from the first computer network and communicatively coupled to the firewall, wherein the analysis computer:
  injects instructions associated with instrumentation code between program code instructions included in the requested computer data, wherein operation of the instrumentation code is transparent to the program code instructions and the operation of the instrumentation code identifies contextual information relating to memory accesses performed by execution of the program code instructions,
  performs an analysis on the memory access contextual information when the instructions associated with the instrumentation code are executed, the analysis identifying a suspicious behavior associated with the memory accesses and a condition associated with the suspicious behavior,
  initiates operation of a first set of exception handling program code to label the program code as non-executable based on the condition,
  sends a message to the firewall based on the suspicious behavior identification, wherein a remaining portion of the computer data is blocked from being sent to the client device based on the message being received by the firewall,
  allows further execution of the program code according to the first set of exception handling program code based on an identification that a first pattern of operations of the program codes does not match a pattern of operations of a set of malware, and
  identifies based on a second analysis performed on additional memory access contextual information that a second pattern of operations of the program code matches the pattern of operation of the set of malware.

17. The system of claim 16, wherein the firewall sends information associated with a web page to the analysis computer.

18. The system of claim 17, wherein the information sent from the firewall is a universal resource locator that identifies the web page.

19. The system of claim 16, wherein the firewall sends information associated with a computer file to the analysis computer.

20. The system of claim 16, wherein the firewall provides at least a portion of the accessed computer data to the client device without sending the remaining portion of the requested computer data to the client device.

\* \* \* \* \*